US012739691B2

(12) United States Patent
Pateromichelakis et al.

(10) Patent No.: US 12,739,691 B2
(45) Date of Patent: Sep. 15, 2026

(54) MANAGING A C2 COMMUNICATION MODE FOR AN UNMANNED AERIAL SYSTEM

(71) Applicant: Lenovo (Singapore) Pte. Ltd., New Tech Park (SG)

(72) Inventors: Emmanouil Pateromichelakis, Viersen (DE); Apostolis Salkintzis, Athens (GR); Dimitrios Karampatsis, Ruislip (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 393 days.

(21) Appl. No.: 17/999,525

(22) PCT Filed: May 20, 2020

(86) PCT No.: PCT/EP2020/064202
§ 371 (c)(1),
(2) Date: Nov. 21, 2022

(87) PCT Pub. No.: WO2021/233548
PCT Pub. Date: Nov. 25, 2021

(65) Prior Publication Data
US 2023/0239724 A1 Jul. 27, 2023

(51) Int. Cl.
*H04W 28/02* (2009.01)
*G08G 5/22* (2025.01)
(Continued)

(52) U.S. Cl.
CPC .......... *H04W 28/0236* (2013.01); *G08G 5/22* (2025.01); *G08G 5/55* (2025.01);
(Continued)

(58) Field of Classification Search
CPC ... H04W 28/0236; H04W 4/023; H04W 4/46; H04W 24/02; H04W 24/10; H04W 76/14;
(Continued)

(56) References Cited

U.S. PATENT DOCUMENTS 9,056,676 B1 * 6/2015 Wang ..................... B64U 50/31
9,185,639 B1 * 11/2015 Sherman .............. H04W 8/005
(Continued)

FOREIGN PATENT DOCUMENTS

WO 2019161925 A1 8/2019
WO WO-2019203884 A1 * 10/2019 ........... H04W 72/30

OTHER PUBLICATIONS

Huawei et al., "Key issue on Support for operation modes selection for C2 communications", 3GPP TSG-SA WG6 Meeting #36BIS-e S6-200605, Mar. 31-Apr. 8, 2020, pp. 1-2.
(Continued)

*Primary Examiner* — Edan Orgad
(74) *Attorney, Agent, or Firm* — Kunzler Needham Hilton

(57) ABSTRACT

Apparatuses, methods, and systems are disclosed for managing a C2 communication mode of operation. One apparatus includes a transceiver supporting a network interface that receives an application request to manage an operation mode of C2 communication for a first UAS. Here, the first UAS comprises a first UAV and a first UAV-C. The network interface receives a first report from an application of the first UAS, where the first application is located in one of the first UAV and the first UAV-C. The apparatus includes a processor that determines to switch the operation mode of C2 communication for the first UAS based on the received first report and transmits, via the network interface, a C2 communication switching instruction to the first UAS.

19 Claims, 11 Drawing Sheets

Direct C2 mode 161

UTM-Navigated C2 mode 163

Indirect C2 mode 165

(51) Int. Cl.

| | |
|---|---|
| ***G08G 5/55*** | (2025.01) |
| ***G08G 5/57*** | (2025.01) |
| ***H04W 4/02*** | (2018.01) |
| ***H04W 4/46*** | (2018.01) |
| ***H04W 24/02*** | (2009.01) |
| ***H04W 24/10*** | (2009.01) |
| ***H04W 76/14*** | (2018.01) |

(52) U.S. Cl.
CPC .............. *G08G 5/57* (2025.01); *H04W 4/023* (2013.01); *H04W 4/46* (2018.02); *H04W 24/02* (2013.01); *H04W 24/10* (2013.01); *H04W 76/14* (2018.02)

(58) Field of Classification Search
CPC ........... H04W 76/23; G08G 5/22; G08G 5/55; G08G 5/57; G08G 5/26; H04B 7/18506; B64C 39/024; H04L 67/30; B64U 2201/20
See application file for complete search history.

(56) References Cited

U.S. PATENT DOCUMENTS 9,537,561 B1* 1/2017 Kotecha .................. H04W 8/00
9,572,186 B2* 2/2017 Yang ..................... H04W 76/14
9,622,133 B1* 4/2017 Guvenc ................. H04W 36/20
9,750,058 B2* 8/2017 Gruet ...................... H04W 4/08
10,271,261 B1* 4/2019 Lindsley ............... H04W 40/14
10,397,357 B2* 8/2019 Coglitore .............. H04L 67/568
10,470,243 B2* 11/2019 Sundaresan ......... H04W 64/003
10,510,260 B2* 12/2019 Priest ....................... G08G 5/26
10,839,700 B2* 11/2020 Frisch ..................... H04W 4/40
11,166,212 B2* 11/2021 Kumar ................. H04B 7/0617
2012/0131663 A1* 5/2012 Anchan ............... H04L 63/0254 726/13
2012/0157146 A1* 6/2012 Theisen ................ H04W 76/14 455/517
2014/0025282 A1* 1/2014 Limbaugh ................ G08G 5/26 701/120
2014/0078898 A1* 3/2014 Anchan ............. H04W 36/0066 370/230
2016/0039542 A1* 2/2016 Wang ...................... B60L 53/52 244/114 R
2017/0111102 A1* 4/2017 Fan ....................... H04W 4/023
2017/0150373 A1* 5/2017 Brennan .................. H01Q 1/28
2017/0208512 A1* 7/2017 Aydin .................. G05D 1/0022
2017/0325221 A1* 11/2017 Jalali ................. H04W 72/0446
2018/0072416 A1* 3/2018 Cantrell ................. B64U 10/13
2018/0074488 A1* 3/2018 Cantrell ............... G05D 1/0246
2018/0136645 A1* 5/2018 Hong ................ H04W 72/0453
2018/0139074 A1* 5/2018 Hong ..................... H04B 7/185
2018/0324662 A1* 11/2018 Phuyal .................. H04W 48/16
2018/0375568 A1* 12/2018 De Rosa .................. G08G 5/34
2019/0045406 A1* 2/2019 Kalathil ............ H04W 36/0094
2019/0063881 A1* 2/2019 Abramov ............... B64U 70/92
2019/0068953 A1* 2/2019 Choi ....................... G01S 17/89
2019/0088156 A1* 3/2019 Choi ....................... G06T 11/60
2019/0182730 A1* 6/2019 Yeh ........................ H04W 24/10
2019/0212724 A1 7/2019 Umesh et al.
2019/0379445 A1* 12/2019 De Rosa .................. G08G 5/32
2020/0045579 A1* 2/2020 Xu ........................ H04L 1/0015
2020/0142432 A1 5/2020 Kwak et al.
2020/0162434 A1* 5/2020 Tang ....................... H04L 69/40
2020/0187035 A1* 6/2020 Maattanen ............ H04L 1/0026
2020/0202730 A1* 6/2020 Nayak .................. H04B 17/345
2020/0252941 A1* 8/2020 Schmidt ................. H04B 7/185
2020/0260259 A1* 8/2020 Zhang ................... H04W 4/025
2020/0266903 A1* 8/2020 De Rosa ............ H04B 7/18506
2020/0285252 A1* 9/2020 Gurdan .................... G09G 5/00
2020/0288407 A1* 9/2020 Kalhan ............... H04W 52/243
2020/0344661 A1* 10/2020 Hong ....................... G08G 5/22
2020/0363824 A1* 11/2020 Levin .................... H04W 4/021
2020/0374889 A1* 11/2020 Kalhan ............. H04W 36/0061
2021/0068028 A1* 3/2021 Wei ..................... H04W 36/322
2021/0160749 A1* 5/2021 Lu ................... H04W 36/00835
2021/0168725 A1* 6/2021 Muruganathan .... H04W 52/146
2021/0185568 A1* 6/2021 Chang ................ H04W 36/328
2021/0206492 A1* 7/2021 Faccin ................ H04W 12/069
2021/0209953 A1* 7/2021 Zhou ...................... B64U 70/90
2021/0219116 A1* 7/2021 Perras ..................... H04W 4/40
2021/0258909 A1* 8/2021 Rydén .................. H04W 72/51
2021/0297877 A1* 9/2021 Che ......................... H02J 50/20
2021/0314112 A1* 10/2021 Balasubramanian ........................ H04L 5/0076
2022/0217618 A1* 7/2022 Yang ..................... H04W 48/04
2022/0377545 A1* 11/2022 Wang .................... H04W 12/06
2023/0133187 A1* 5/2023 Ferdi .................. H04W 12/068 455/411
2023/0199863 A1* 6/2023 Ferdi ..................... H04W 76/10 370/329

OTHER PUBLICATIONS

PCT/EP2020/064202, "Notification of Transmittal of the International Search Report and the Written Opinion of the International Searching Authority, or the Declaration", International Searching Authority, Jan. 26, 2021, pp. 1-11.

Interdigital et al., "Clarification of the definition of a Uas", 3GPP TSG-SA1 Meeting #90 S1-202058, May 18-22, 2020, pp. 1-4.

3GPP, "3rd Generation Partnership Project; Technical Specification Group Services and System Aspects; Unmanned Aerial System (UAS) support in 3GPP; Stage 1; Release 17", 3GPP TS 22.125 V17.1.0, Dec. 2019, pp. 1-16.

3GPP, "3rd Generation Partnership Project; Technical Specification Group Services and System Aspects; Proximity-based services (ProSe); Stage 2 (Release 15)", 3GPP TS 23.303 V15.1.0, Jun. 2018, pp. 1-130.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.6.0, Mar. 2020, pp. 1-436.

3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.3.0, Mar. 2020, pp. 1-120.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Study on application layer support for Factories of the Future in 5G network; (Release 17)", 3GPP TR 23.745 V0.7.0, Jan. 2020, pp. 1-27.

Intel, China Unicom, "Definition and introduction of C2 Communication", 3GPP TSG-SA WG1 Meeting #87 S1-192791, Aug. 19-23, 2019, pp. 1-4.

Huawei, Hisilicon, "Key issue on Support for operation modes selection for C2 communications", Mar. 31-Apr. 8, 2020, pp. 1-2.

* cited by examiner

UAV 201
UAE Client 301
UAV UE 303
UAV-C 203
UAE Client 305
UAV-C UE 307
UTM or UAS-specific Server 311
UAE Server 221
333
4b. UAV/UAV-C location processing / augmentation
335
5. C2 Session Switching Trigger
337
6. C2 Mode Adapt Request/Response
7. C2 UAE Session Change Request (Switch to Indirect Mode)
339
8a. Switch C2 Session Mode
341
8a. Switch C2 Session Mode
341
8b. C2 UAE Session Change Response / Notification
343
300

Figure 4A:
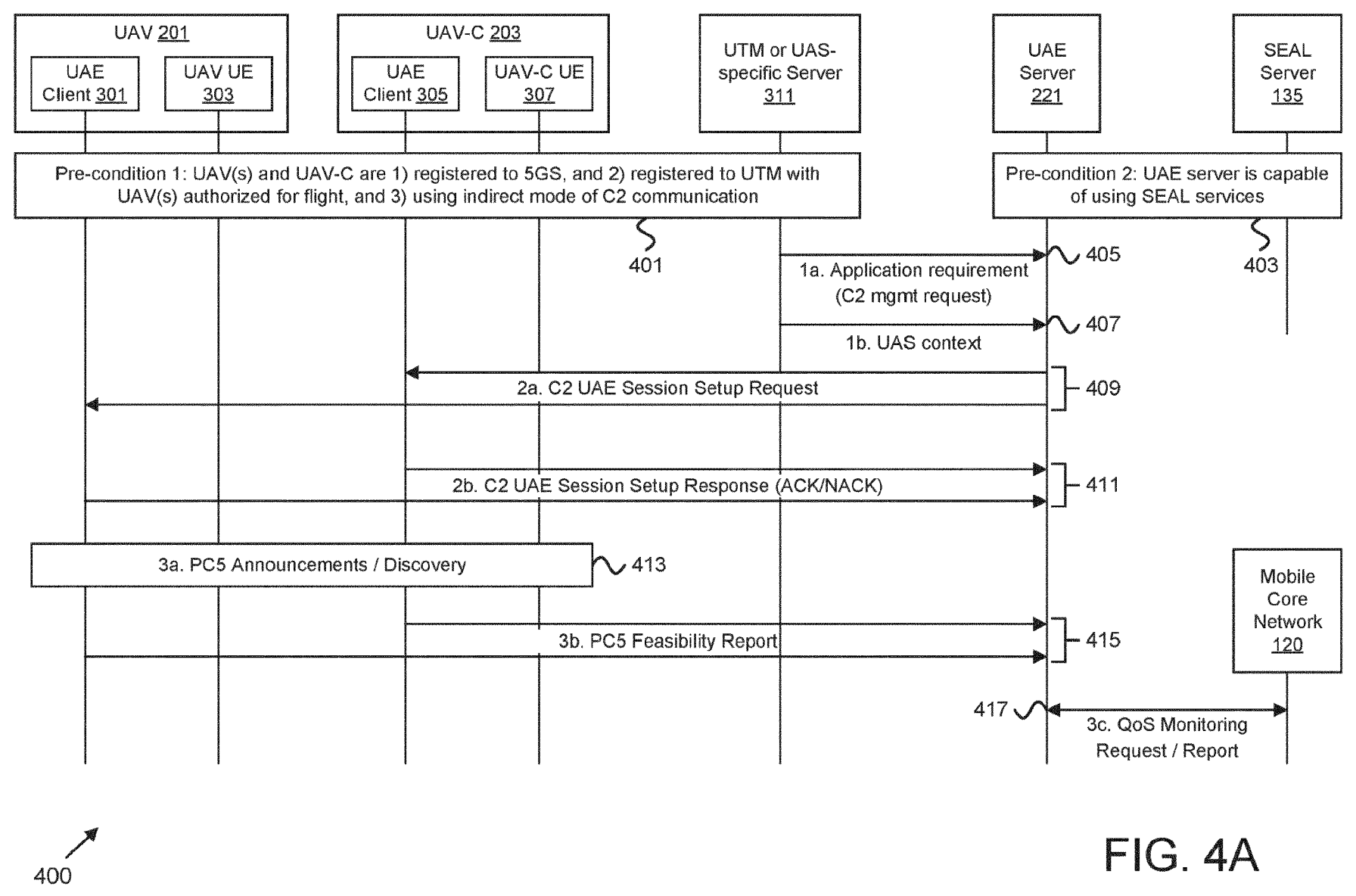

SEAL Server 135

Pre-condition 2: UAE server is capable of using SEAL services

403

Mobile Core Network 120

UAE Server 221

405

407

409

411

415

3c. QoS Monitoring Request / Report

417

UTM or UAS-specific Server 311

1a. Application requirement (C2 mgmt request)

1b. UAS context

2a. C2 UAE Session Setup Request

2b. C2 UAE Session Setup Response (ACK/NACK)

3b. PC5 Feasibility Report

UAV-C 203

UAE Client 305

UAV-C UE 307

401

413

3a. PC5 Announcements / Discovery

UAV 201

UAE Client 301

UAV UE 303

Pre-condition 1: UAV(s) and UAV-C are 1) registered to 5GS, and 2) registered to UTM with UAV(s) authorized for flight, and 3) using indirect mode of C2 communication

MANAGING A C2 COMMUNICATION MODE FOR AN UNMANNED AERIAL SYSTEM

FIELD

The subject matter disclosed herein relates generally to wireless communications and more particularly relates to managing a C2 communication mode of operation.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Fifth Generation QoS Identifiers ("5QI"), Authentication, Authorization and Accounting ("AAA"), Advanced Intersection Collision Warning ("AICW"), Access and Mobility Management Function ("AMF"), Positive-Acknowledgment ("ACK"), Application Programming Interface ("API"), Access Stratum ("AS"), Base Station ("BS"), Beyond Line-of-Sight ("BLOS"), Category of Requirements ("CoR"), Command-and-Control ("C2"), Control Element ("CE"), Cooperating merging ("CM"), Cooperative Overtaking ("CO"), Cooperating Transition of Control ("CToC"), Cooperative Lane Change ("CLC"), Collective Perception ("CP"), Collective Perception Message ("CPM"), Core Network ("CN"), Connected and Autonomous Vehicle ("CAV"), Channel Busy Ratio ("CBR"), Decentralized Environmental Notification Message ("DENM"), Downlink ("DL"), Discontinuous Transmission ("DTX"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), Fully Qualified Domain Name ("FQDN"), General Packet Radio Service ("GPRS"), Generic Public Service Identifier ("GPSI"), Global System for Mobile Communications ("GSM"), Hybrid Automatic Repeat Request ("HARQ"), Home Subscriber Server ("HSS"), Information Element ("IE"), Internet-of-Things ("IoT"), International Mobile Equipment Identity ("IMEI"), Intelligent Transportation System ("ITS"), ITS Station ("ITS-S"), Infrastructure to Vehicle Information Message ("IVIM"), Key Performance Indicator ("KPI"), Line-of-Sight ("LOS"), Level of Automation ("LoA"), Long Term Evolution ("LTE"), Mobility Management ("MM"), Mobility Management Entity ("MME"), Map (topology) Extended Message ("MAPEM"), Maneuver Control ("MC"), Maneuver Control Message ("MCM"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Slice Selection Assistance Information ("NSSAI"), Network Exposure Function ("NEF"), Overtaking Vehicle Warning ("OVW"), Partially Qualified Domain Name ("PQDN"), Packet Data Unit ("PDU", used in connection with 'PDU Session'), PC5 5QI ("PQI"), Permanent Equipment Identifier ("PEI"), Platoon Control ("PC"), Platoon Control Message ("PCM"), Proximity Service ("ProSe"), Public Land Mobile Network ("PLMN"), Quality of Service/Experience ("QoS"), Radio Access Network ("RAN"), Receive ("RX"), Road Side Unit ("RSU"), Service Enabler Architecture Layer ("SEAL"), Session Management ("SM"), Session Management Function ("SMF"), Service Provider ("SP"), Service Capability Exposure Function ("SCEF"), Single Network Slice Selection Assistance Information ("S-NSSAI"), Signal Phase And Timing Extended Message ("SPATEM"), Signal Request Extended Message ("SREM"), Signal request Status Extended Message ("SSEM"), Subscription Permanent Identifier ("SUPI"), Subscription Concealed Identifier ("SUCI"), Target Driving Area Reservation ("TDAR"), Transport Block ("TB"), Transmit ("TX"), Vehicle-to-Everything ("V2X"), Vehicle-to-Infrastructure ("V2I"), Vehicle-to-Vehicle ("V2V"), Vehicle-to-Relay ("V2R"), V2X Application Enabler ("VAE"), Vulnerable Road User Protection ("VRUP"), Unified Data Management ("UDM"), Unmanned Aerial System ("UAS"), UAS Application Enabler ("UAE", i.e., having a UAE server and at least one UAE client), UAS Traffic Manager ("UTM"), UAS Service Supplier ("US S"), Unmanned Aerial Vehicle ("UAV"), UAV Controller ("UAV-C"), User Data Repository ("UDR"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), User Service Description ("USD"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain communication systems, an Unmanned Aerial System ("UAS") may be configured with a Command-and-Control ("C2") communication mode. In certain embodiments, the following C2 communications are considered to provision UAS services by guaranteeing QoS for the C2 communication: 1) Direct C2 communication, 2) Network-Assisted C2 communication (aka "Indirect C2 communication"), and 3) UTM-Navigated C2 communication.

BRIEF SUMMARY

Methods for managing a C2 communication mode of operation are disclosed. Apparatuses and systems also perform the functions of the methods.

One method of a UAS application enabler ("UAE") client includes: receiving an application request to manage an operation mode of Command-and-Control ("C2") communication for a first unmanned aerial system ("UAS"), the first UAS comprising a first unmanned aerial vehicle ("UAV") and a first UAV controller ("UAV-C"); receiving a first report from an application of the first UAS, wherein the first application is located in one of the first UAV and the first UAV-C; determining to switch the operation mode of C2 communication for the first UAS based on the received first report; and transmitting a C2 communication switching instruction to the first UAS.

One method of a UAE client includes: receiving a first request message to monitor link conditions for an operation mode of C2 communication for a first UAS, the first UAS comprising a first UAV and a first UAV-C; transmitting a first report based on the monitored link conditions, wherein the first report comprises one of a direct mode feasibility report and a trigger event report; receiving a C2 communication switching instruction to the application of the first UAS; and modifying a C2 communication session of the first UAS in response to the C2 communication switching instruction.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a diagram illustrating signaling flow for another embodiment of a procedure dynamically switching an operation mode for C2 communication;

DETAILED DESCRIPTION

Figure 1A:
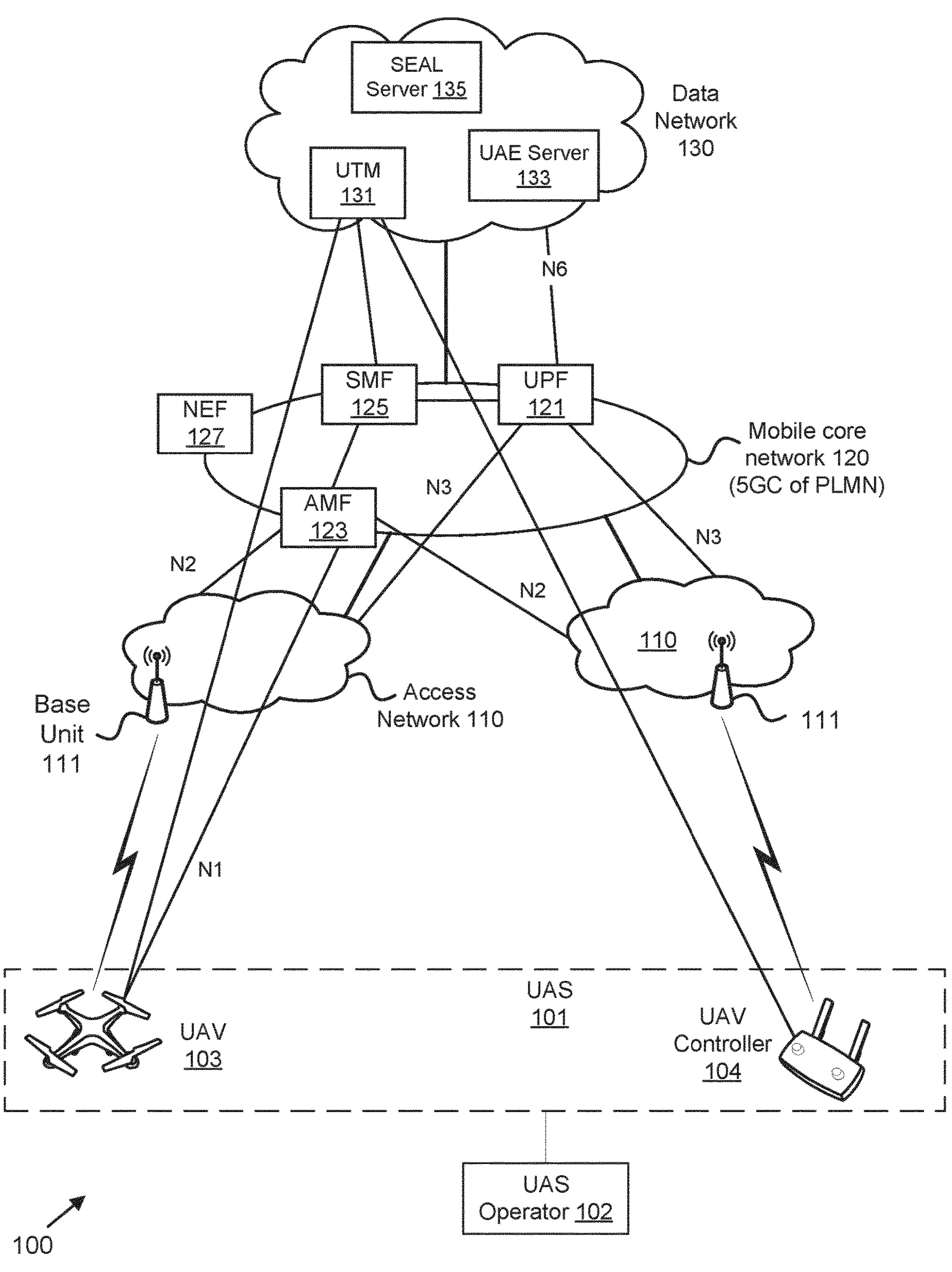
FIG. 1A is a schematic block diagram illustrating one embodiment of a wireless communication system for managing a C2 communication mode of operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for managing a Command and Control ("C2") communication mode of operation for UEs engaged in UAV-related C2 communication. Disclosed herein are mechanisms/techniques for how to enable the C2-mode switching for one or more UASs.

In Direct C2 communication, the UAV controller and UAV establish a direct C2 link to communicate with each other and both are registered to the 5G network using the radio resource configured and scheduled provided by the 5G network for direct C2 communication.

In Network-Assisted C2 communication (aka "Indirect C2 communication"), the UAV controller and UAV register and establish respective unicast C2 communication links to the 5G network and communicate with each other via 5G network. Also, both the UAV controller and UAV may be registered to the 5G network via different NG-RAN nodes. The 5G network needs to support mechanism to handle the reliable routing of C2 communication.

In UTM-Navigated C2 communication, the UAV has been provided a pre-scheduled flight plan, e.g., an array of 4D polygons, for autonomous flying, however UTM still maintains a C2 communication link with the UAV in order to regularly monitor the flight status of the UAV, verify the flight status with up-to-date dynamic restrictions, provide route updates, and navigate the UAV whenever necessary.

The configuration of the C2 mode may need to be adapted for a UAS while flight is ongoing, due to possible change of radio conditions, traffic situation, interference from other UAVs, unpredictable events etc. Also, the UTM 131 may need to take the control of the UAV 103 on-demand if the UAV behavior is problematic.

Some examples to better capture the need for dynamic adaptation:

In a first scenario, the UAV 103 is controlled by the UAV-C 104 using direct C2 when the flight starts. However as the UAV 103 travels away from the UAV-C 104 (e.g., approaches BLOS), the direct communication link gets worse, and a change to network-assisted mode may be needed before the PC5 link drops in order to ensure that the UAV 103 does not experience any service disruption (which may lead to loss of connectivity).

In a second scenario, the network-assisted mode (in-direct) is used to facilitate the C2 communication in BLOS conditions; however, when the PC5 is again feasible/available, it may be preferable to switch to direct mode in a fast manner and without any loss of data. The feasibility/preference of PC5 may be, for example, when the UAV 103 returns towards the UAV-C 104 or when the expected QoS over PC5 is better than Uu, (e.g., due to possible congestions/QoS degradation/resource starvation/coverage hole in one or both Uu links).

For these reasons, one requirement when the C2 communication utilizes one or more 3GPP systems for the communication, is to support the communication link switching, while UAV session is ongoing. This will be needed to:

A) Enhance/Guarantee KPI for UAS e.g. for reliability critical communications, especially in BLOS scenarios where the pilot is far from the UAV.

B) Ensure service continuity, e.g., when UAV flies far from UAV-C and the connection may drop, or UAV is roaming to different PLMN or if there is a network failure/shortage of resources/congestion in one or more Uu links.

There are some key issues related to the change of C2 communication mode when a UAS operation is ongoing:

A) There is no mechanism in 3GPP for enabling the dynamic switching between direct and in-direct C2 modes, while an UAV flight session is ongoing.

B) There is currently no guarantee of service continuity of C2 communication, while switching between C2 modes.

Some impact to other UAVs, UEs/aerial UEs in proximity may be expected when deciding the switching, in case the C2 communication is switched to congested Uu or PC5 links shared with other UAVs.

As such, one problem addressed by the present disclosure is how to enable dynamic C2 mode switching for one or more UAV-C/UAV pairs, while assuring service continuity and minimum impact the operation of other UASs. This problem can be decomposed in two sub-problems based on the scenario:

Sub-problem #1: How to enable dynamic switching from direct C2 to indirect C2 for one or more UAS 101 while the flight is operating, due to the fact that a UAV 103 is moving towards BLOS or has poor PC5 conditions? Solutions for sub-problem #1 are discussed in detail with reference to FIGS. 3A-3B.

Sub-problem #2: How to enable dynamic switching from indirect C2 to direct C2 for one or more UAS 101 while the flight is operating, when the direct C2 link again becomes available/feasible (and preferable)? Solutions for sub-problem #2 are discussed in detail with reference to FIGS. 4A-4B.

For both sub-problems, one key constraint is that during this transition from one mode to the other, there is a need to avoid C2 service disruption and/or QoS degradation. In some embodiments, the UAE server 221 (middleware platform) triggers the switching modes of operations.

In contrast, to direct/indirect communication mode switching in conventional UEs, the UAV is not trusted to decide the mode switching based on some triggering event. Note that the UAS 101 comprises different types of UEs, for example, aerial vehicles 103 and UAV controllers 104. Also, note that in UAS the UAV-C 104 may be very far from the UAVs 103. This requires enhanced mechanisms for monitoring of the real-time situation by UTM 131/3gpp network in both ends (in V2V, CBR measurements/sensing can be used for the switching). It is also high probable that UAV 103 and UAV-C 104 are connected to different cells and/or different PLMNs, thus requiring additional access network and/or core network coordination not needed in V2X scenarios.

In UAS, the UAVs 103 may be restricted to fly in certain zones. This means that the possibility of collisions with other drones is much higher than V2X and the trigger criteria for a mode switching will be different that V2X scenarios.

FIG. 1A depicts a wireless communication system 100 for managing a C2 communication mode of operation, according to embodiments of the disclosure. In one embodiment, the wireless communication system 100 includes at least one access network 110 and a mobile core network 120. As depicted, the wireless communication system 100 may include a first access network serving the UAV 103 and a second access network serving the UAV controller 104. Here, the wireless communication system 100 includes at least a first core network 120 belonging to the PLMN-a and a second core network 130 belonging to the PLMN-b. The access network(s) 110 and the mobile core network 120 form a mobile communication network.

An Unmanned Aerial System ("UAS") 101 includes an Unmanned Aerial Vehicular ("UAV") 103 and an UAV Controller 104. The UAS Operator 102 is the person who operates the UAV 103 (e.g., via the UAV Controller 104). The UAV 103 and UAV controller 104 may each be UEs in the wireless communication system 100. As such, the UAV 103 and/or UAV controller 104 may communicate with an access network 110 to access services provided by a mobile core network 120.

Even though a specific number of UAVs 103, UAV controllers 104, access networks 110, and mobile core networks 120 are depicted in FIG. 1A, one of skill in the art will recognize that any number of UAVs 103, UAV controllers 104, access networks 110, and mobile core networks 120 may be included in the wireless communication system 100.

Each access networks 110 contains at least one base unit 111 and may be composed of a 3GPP access network (containing at least one cellular base unit) and/or a non-3GPP access network (containing at least one access point). In various embodiments, an access network 110 is a radio access network, such as a 5G-RAN. A UE (e.g., the UAV 103 and/or UAV controller 104) may communicate with a 3GPP access network using 3GPP communication links and/or communicates with a non-3GPP access network using non-3GPP communication links.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, a UE (e.g., UAV 103 and/or UAV controller 104) may include computing devices, such as desktop computers, laptop computers, personal digital assistants ("PDAs"), tablet computers, smart phones, smart appliances (e.g., appliances connected to the Internet), game consoles, remote controllers, or the like. Moreover, the UEs may be referred to as remote units, subscriber units, mobiles, mobile stations, users, terminals, mobile terminals, fixed terminals, subscriber stations, user terminals, wireless transmit/receive unit ("WTRU"), a device, or by other terminology used in the art.

The UEs (e.g., the UAV 103 and/or UAV controller 104) may communicate directly with one or more of the base units 117 in the access network 115 via uplink ("UL") and downlink ("DL") communication signals. In some embodiments, the UL and DL communication signals are carried over the 3GPP communication links. In other embodiments, the UL and DL communication signals are carried over the non-3GPP communication links. Here, the access networks 115 are intermediate networks that provide the UAV 103 and/or UAV controller 104 with access to the mobile core networks 120, 130.

In some embodiments, the UEs communicate with one or more UAV Traffic Management ("UTM") functions via a network connection with the mobile core networks 120, 130. As described in further detail below, the UAV 103 may establish a PDU session (or similar data connection) with the mobile core networks 120, 130 using the access network 115. The mobile core networks 120, 130 then relays traffic between the UE and the data network 140 using the PDU session. Note that the UE may establish one or more PDU sessions (or other data connections) with the mobile core networks 120, 130. As such, the UE may have at least one PDU session for communicating with the data network 140. The UE may establish additional PDU sessions for communicating with other data network and/or other remote hosts.

The base units 111 may be distributed over a geographic region. In certain embodiments, a base unit 111 may also be referred to as an access point, an access terminal, a base, a base station, a Node-B, an eNB, a gNB, a Home Node-B, a relay node, a device, or by any other terminology used in the art. The base units 111 are generally part of a radio access network ("RAN"), such as access network 110, that may include one or more controllers communicably coupled to one or more corresponding base units 111. These and other elements of radio access network are not illustrated but are well known generally by those having ordinary skill in the art. The base units 111 connect to the mobile core network 120 via the access network 110.

The base units 111 may serve a number of UEs within a serving area, for example, a cell or a cell sector, via a wireless communication link. The base units 111 may communicate directly with one or more of the UEs via communication signals. Generally, the base units 111 transmit DL communication signals to serve the UEs in the time, frequency, and/or spatial domain. Furthermore, the DL communication signals may be carried over the communication links. The communication links may be any suitable carrier in licensed or unlicensed radio spectrum. The communication links facilitate communication between one or more of the UEs and/or one or more of the base units 111.

In one embodiment, the mobile core network 120 is a 5G core ("5GC") or the evolved packet core ("EPC"), which may be coupled to a data network (e.g., the data network 130, such as the Internet and private data networks, among other data networks. A UE may have a subscription or other account with the mobile core network 120. Each mobile core network 120 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 120 may include one or multiple user plane functions ("UPFs") 121. The mobile core network 120 also includes multiple control plane functions including, but not limited to, an Access and Mobility Management Function ("AMF") 123, and a Session Management Function ("SMF") 125, and a Network Exposure Function ("NEF") 127. In certain embodiments, the mobile core network 120 may also include an Authentication Server Function ("AUSF"), a Policy Control Function ("PCF"), and a Unified Data Management function ("UDM"), a Network Repository Function ("NRF") (used by the various NFs to discover and communicate with each other over APIs), or other NFs defined for the 5GC. In certain embodiments, the mobile core network 120 may include a AAA server.

In various embodiments, the mobile core network 120 supports different types of mobile data connections and different types of network slices, wherein each mobile data connection utilizes a specific network slice. Here, a "network slice" refers to a portion of the mobile core network 120 optimized for a certain traffic type or communication service. A network instance may be identified by a S-NSSAI, while a set of network slices for which the UE (e.g., UAV 103 and/or UAV controller 104) is authorized to use is identified by NSSAI. In certain embodiments, the various network slices may include separate instances of network functions, such as the SMF 125 and UPF 121. In some embodiments, the different network slices may share some common network functions, such as the AMF 123. The different network slices are not shown in FIG. 1A for ease of illustration, but their support is assumed.

Although specific numbers and types of network functions are depicted in FIG. 1A, one of skill in the art will recognize that any number and type of network functions may be included in the mobile core network 120. Moreover, where the mobile core network 120 is an EPC, the depicted network functions may be replaced with appropriate EPC entities, such as an MME, S-GW, P-GW, HSS, and the like.

In the following descriptions, the term gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for UAS operation.

As depicted, a UE (e.g., the UAV 103 and/or UAV controller 104) may connect to the mobile core network (e.g., to a 5G mobile communication network) via an access network 115. Connecting to the mobile communication network (e.g., a combination of access network and mobile core network) allows the UAV 103 to operate at increased distances from the UAV controller 104 and does not require a line-of-sight connection between the UAV 103 and UAV controller 104.

Generally, the UAS 101 may interact with one or more UAV traffic management ("UTM") functions 131 when operating the UAV 103 and/or filing flight plans. In various embodiments, each mobile core network 120 that supports UAV operation is able to communicate with one or more UTMs 131.

The UTM 131 is an element that manages UAV operation for one or multiple UAVs 103 and UAV controller 104. In various embodiments, a UTM 131 monitors UAVs 103 and UAV Controllers 104 operating in a specific uncontrolled airspace (e.g., below 400 feet above the ground). Managing UAV operation may include providing flight authorizations, performing collision avoidance, determining alternative flight routes, ensuring that UAV operation remains within authorized limits, etc. In various embodiments, the operation of a UTM is similar to the operation of an Air Traffic Controller (ATC), which manages manned aircrafts on the ground and in controlled airspace (above 400 feet).

In many scenarios, a UAV controller 104 establishes a connection to a UAV 103 via one or more 5G systems. For example, the UAV controller 104 may establish a data connection to the UAV 103 via the access network 115 and the core network 120. When the UE (e.g., one of the UAV 103 and UAV controller 104) requests to establish a data connection (e.g., a PDU session) for UAV operation, the SMF 125 selects a UTM 131 and verifies the UAV operation.

The UTM 131 may send a request to a UAE server 133 to manage the operation mode of a C2 communication session for a UAS 101, as discussed in further detail below with reference to FIGS. 2, 3A-3B, and 4A-4B. The UAE server 133 collects information to aid in determining whether to dynamically adapt a C2 communication mode of the UAS 101. In various embodiments, the UAE server 133 receives direct link condition information from the UAV 103 and/or UAV controller 104. Additionally, the UAE server 133 may receiving location and other information from a Service Enabler Application Layer (SEAL) server 135.

The SEAL server 135 provides on-demand (subscription or request) services for all vertical enabler layer (aka middleware) platforms (e.g., UAE servers 133). Vertical specific support functionalities between the application specific servers and the mobile core network 120. Common support functionalities (Service Platform enabling common capabilities for quicker onboarding of new Verticals) include Location Management, Group Management, Network Resource Management, Configuration Management Servers, etc., and can be used as services to vertical specific enablers.

Note the while the below descriptions consider the mobility of the UAV 103, but assume the UAV controller 104 to remain stationary, in other embodiments the mobility of the UAV controller 104 may require the UAE server to consider the changing radio link conditions of the UAV controller 104 due to mobility, interference, etc.

Figure 1B:
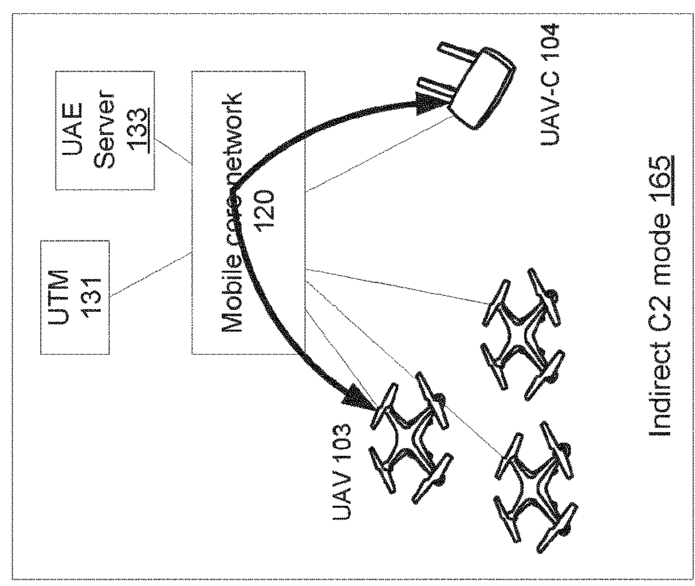
FIG. 1B is a block diagram illustrating operation modes for C2 communication.
Figure 1B:
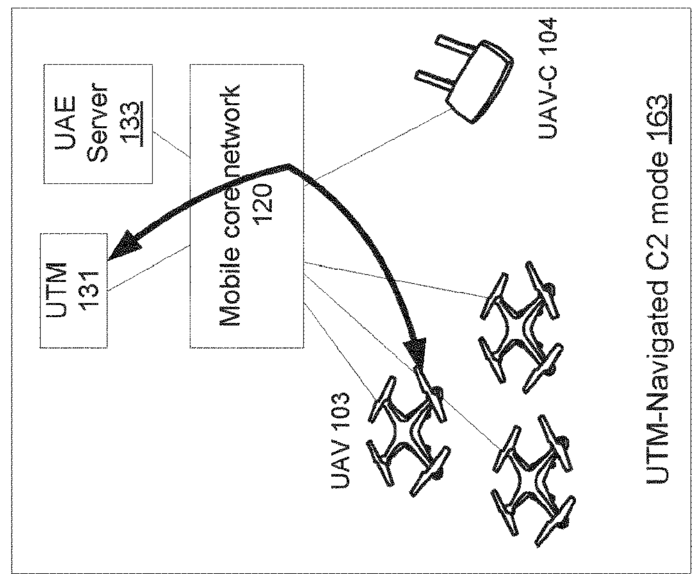
Figure 1B:
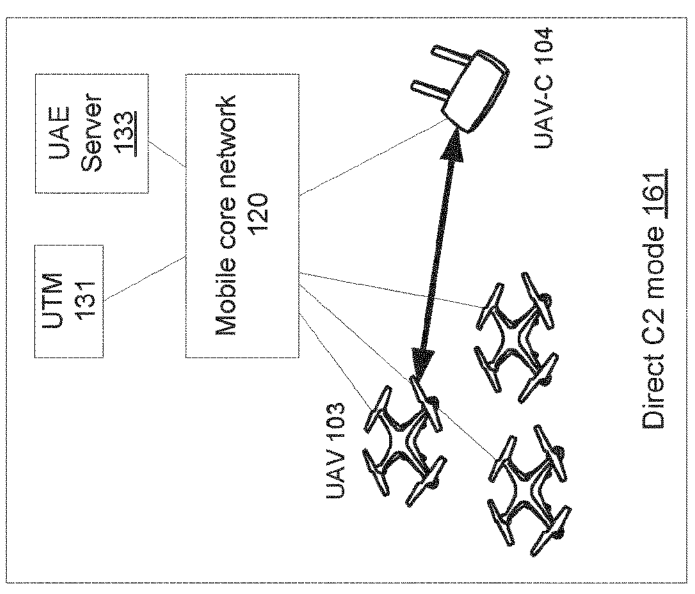

FIG. 1B depicts various operation modes for a C2 communication session for a UAS. In the direct C2 mode 161, the UAV controller (UAV-C) 104 uses a direct connection with the UAV(s) 103 to establish a C2 communication session. Here, the direct connection may use the PC5 reference point. Note that the PC5 reference point may be referred to herein as the "PC5 interface." With the direct connection, the UAV-C 104 may send flight instructions to the UAV(s) 103. Note that in some implementations, the direct connection may require line-of-sight between the UAV-C 104 and the UAV(s) 103.

In the UTM-Navigated C2 mode 163, the UTM 131 establishes a C2 communication session with the UAV(s) 103 via the mobile core network 120 (and access network 110). Via the mobile network connection, the UTM 131 sends flight instructions to the UAV(s) 103. Note that the UTM-Navigated C2 mode 163 does not require line-of-sight between the UAV-C 104 and the UAV(s) 103.

In the Indirect C2 mode 165, the UAV-C 104 establishes a C2 communication session with the UAV(s) 103 via the mobile core network 120 (and access network 110). Via the mobile network connection, the UAV-V 104 may send flight instructions to the UAV(s) 103. Note that the Indirect C2 mode 163 does not require line-of-sight between the UAV-C 104 and the UAV(s) 103.

For UAVs 103 there is currently no solution for providing C2 mode selection and configuration in prior art. However, it can be assumed that at the registration of the UAVs and/or the flight authorization phase, an initial C2 configuration is provided to the UAV(s) 103 either by the UAV-C 104 or by the UTM 131 (or a UAS-specific application server).

Figure 2:
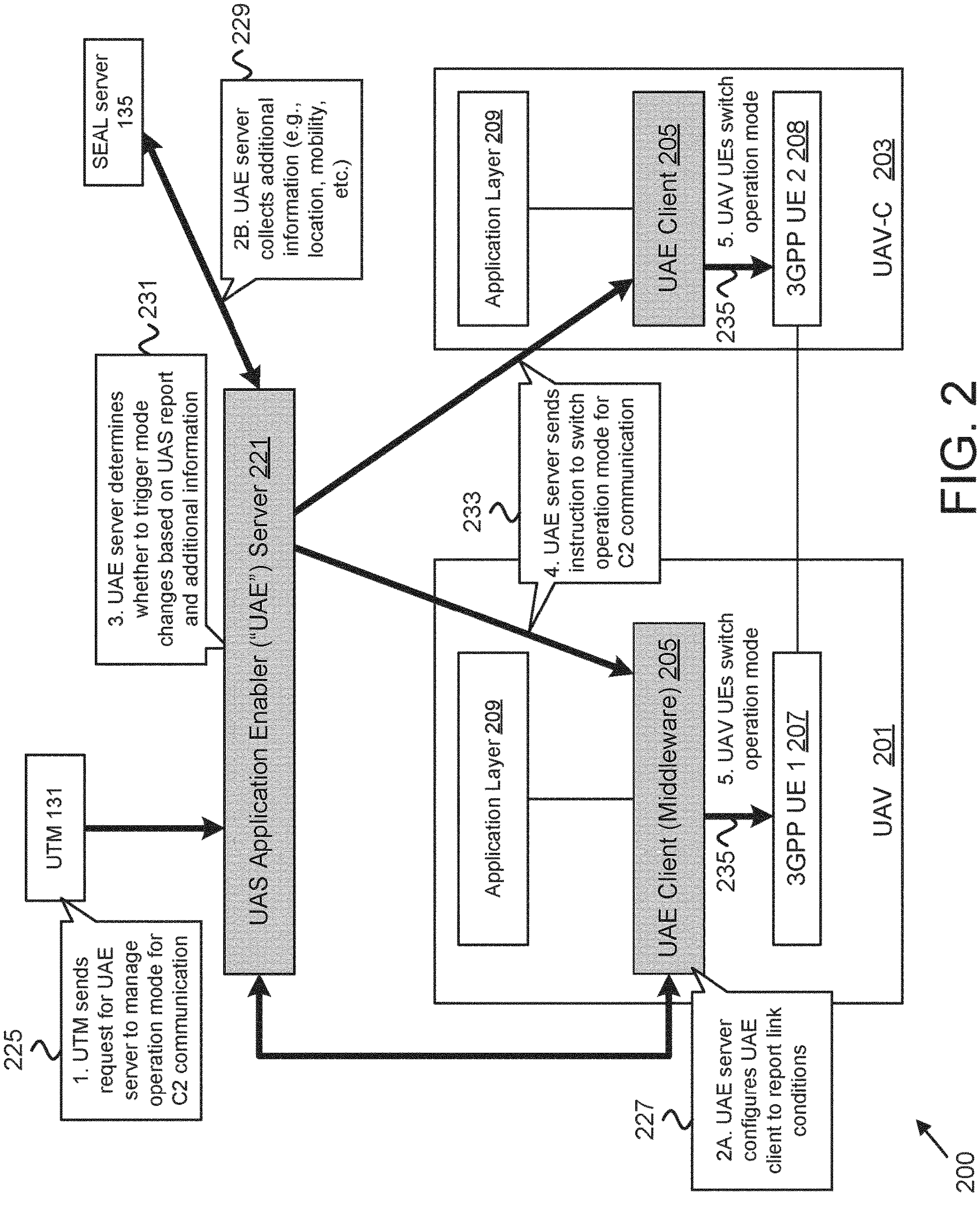
FIG. 2 is a diagram illustrating one embodiment of a network architecture for managing a C2 communication mode of operation.

FIG. 2 depicts a network architecture 200 for managing a C2 communication mode of operation, according embodiments of the disclosure. The network architecture 200 includes a UAV 201, a UAV-C 203, a UAE server 221, the UTM 131, and the SEAL server 135. The UAV 201 may be one embodiment of the UAV 103, described above, and includes an application layer 209, a middleware layer with a UAE client 205 and a 3GPP UE 207 (i.e., having a cellular modem functionality). The UAV-C 203 may be one embodiment of the UAV controller 104, described above, and includes an application layer 209, a middleware layer with a UAE client 205 and a 3GPP UE 208 (i.e., having a cellular modem functionality).

As discussed above, the UAV 201 and UAV-C 203 communicate over the PC5 reference point when operating in the direct mode of C2 communications. Here, it is assumed that the UAV 201 and UAV-C 203 are connected to a 5G system ("5GS") for operating in the indirect mode of C2 communications.

The UAS Application Enabler ("UAE") server 221 is a middleware platform which interfaces with the UAE client middleware 207 on the V2X UEs (i.e., located in the between the Application layer 209 and the 3GPP/cellular modem layers). The UAE server 221 is one embodiment of the UAE server 133. Note that the UAE server 221 and UAE clients 205 form a distributed V2X middleware.

Disclosed herein is a mechanism for and dynamically switching the operation mode of a C2 communication session established between the UAV 201 and the UAV-C 203. At Step 1, the UAS server 221 receives a request to manage switching of the C2 operation mode for the UAS comprising a first UAE client 205 in the UAV 201 and a second UAE client 205 in the UAV-C 203 (see messaging 225).

At Step 2*a*, the UAE server 221 configures the UAE client(s) 205 (in UAV, in UAV-c, or in both) to send one or more reports to UAE server when a first condition occurs (see messaging 227). In one example, the UAS operates in the direct mode and the first report indicates that direct mode operation is degraded (e.g. loss rate>X). In another example, the UAS operates in the indirect mode and the UAE server configures a UAE client to monitor direct mode conditions (e.g. loss rate) and to send first reports to UAE server when a first condition occurs (e.g., loss rate of direct mode operation<X), which implies that direct mode operation is feasible.

At Step 2*b*, the UAE server 221 also collects location information, e.g., from SEAL server(s) 135 and/or 3GPP network, in response to receiving the request (see messaging 229), wherein the information is used to determine whether to trigger an action based on a UAE client report. The UAE Server 221 also processes (i.e., augments) the received location information with additional information mobility/position information (speed, ground Radar, RID broadcast) which may be provided by UTM 131 and/or a UAS-specific application server as part of Step 1.

For example, a report from the UAE client 205 may not be actionable if the additional information indicates that the condition in the report is temporary (due to temporary NLOS conditions between UAV 210 and UAV-C 203).

As another example, the UAE server collects location information from SEAL servers and/or 3GPP network and may determine that a first report indicating that direct mode operation is feasible is not actionable because the UAV is flying by the location of the UAV controller in fast speed.

At Step 3, the UAE server determines whether to trigger a change in C2 operation mode based on the UAE client report by using the collected/processed additional information (see block 231).

Note that when the UAS initially operates in a direct mode of C2 communication, the UAE server 221 may receive from the UAE client 205 (e.g., in the UAV 201) a trigger event, indicating that direct mode of C2 operation is degraded (which may be due to direct link quality degradation).

In contrast, when the UAS initially operates in an indirect mode of C2 communication, the UAE server 221 may receive from a UAE client 205 (e.g., in the UAV 201, in the UAV-C 203, or in both) a feasibility report. For example, the UAV-C 203 may receive the ProSe announcements sent by UAV 201 with acceptable quality (e.g. loss rate<X).

In the depicted scenario, at Step 4 the UAE server 221 determines to trigger mode change and provides a request/notification to UAE clients 205 of both UAV 201 and UAV-C 203 to switch to the operation mode (see messaging 233). Accordingly, a UAS already operating in direct mode will receive an instruction to switch to the indirect mode. Similarly, a UAS already operating in the indirect mode will receive an instruction to switch to the direct mode.

At Step 5, the UAE clients 205 pass this instruction to lower layers/AS layer (see messaging 235), thereby triggering the 3GPP UEs to switch to the C2 communication mode of operation indicated by the request/notification received from the UAE server 221.

Figure 3A:
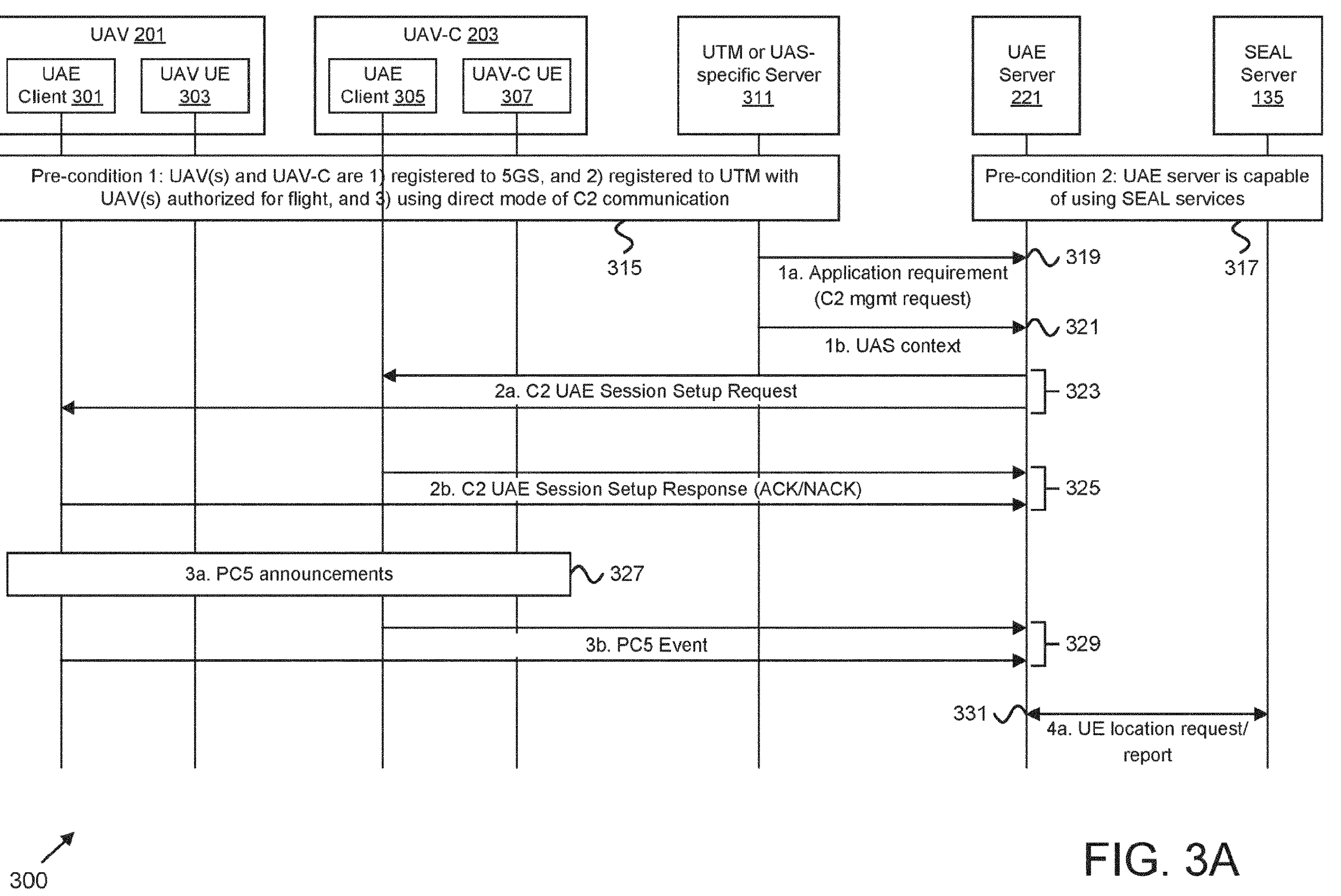
FIG. 3A is a diagram illustrating signaling flow for one embodiment of a procedure dynamically switching an operation mode for C2 communication.
Figure 3B:
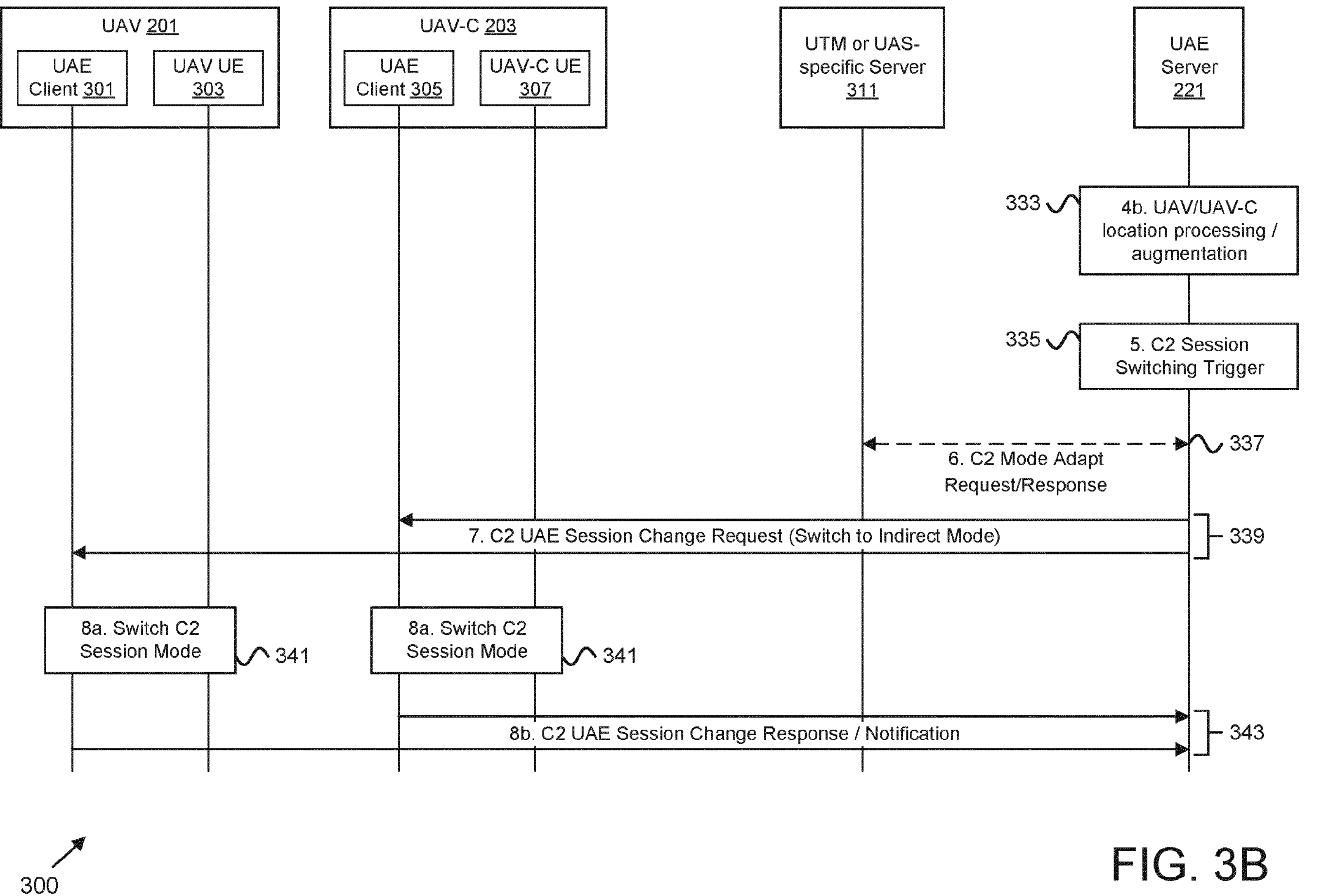
FIG. 3B continues the procedure of FIG. 3B.

FIGS. 3A-3B depict a procedure 300 for managing a C2 communication mode of operation, according to embodiments of the disclosure. The procedure 300 involves the UAV 201 (comprising a first UAE client 301 and a UAV UE 303), the UAV-C 203 (comprising a second UAE client 305 and a UAV-C UE 307), a UTM or UAS-specific application server 311 the UAE server 221, and the SEAL server 135. In the depicted embodiment, the middleware is distributed among a server and a client (aka UAE server 221 and UAE clients 301, 305 respectively).

The inputs for enabling the C2-mode configuration function to trigger the switching from direct mode to indirect mode, include:

A) Application-specific requirement, which in this case can be a requirement from the application specific server (or UTM) to give the capability to UAE server to manage the C2 communication. Note, that if the UAE server has already the authorization/capability to perform this action, no requirement needs to be conveyed, unless there is some updated requirement. This will trigger the establishment of an application session between the UAE server and client(s) for enabling the UAE server to receive direct link information and provide the required adaptations to the clients when/if required. Application specific server may also provide additional UAS context information, and in particular information mobility/position of the UAV (speed, ground Radar, RID broadcast).

B) Inputs from application servers/UTM:

1) The SEAL server 135 is a support entity (e.g., as defined in 3GPP TS 23.434) which provides on-demand (subscription or request) services for all vertical enablers (e.g., UAE servers). The information that the SEAL server (s) 135 can provide to the UAE server 221 to support the C2 decision making process is the following:

i) From Location Management (LM) Server: the precise location of the UAVs and ground UEs in a given area (cell/TA area) which is acquired based on subscription to location monitoring by the UAVs/UAV-Cs.

2) The UTM provides support services to a UAS operator, such as services that are required to be used by the UAS operator due to governmental regulation, services that have a direct connection to a regulatory agency's system, services that may be used by the UAS operator to meet all or part of a governmental regulation, and services that provide value-added assistance to the UAS operator, but are not used for regulatory compliance (e.g., to meet an industry standard). Examples of specific support services include, but are not limited to, operations planning, intent sharing, strategic and tactical de-confliction, conformance monitoring, RID, Airspace Authorization, airspace management functions, and management of off-nominal situations. If we assume that the UAE acts on behalf of the UAS operator, the following information can be provided to aid the C2 switching:

i) Dynamic Reroute [inflight rerouting can be provided by UTM to avoid airborne conflicts. If UAE is aware of the UAV's updated expected trajectories, it can help deciding whether to keep direct or to proactively switch to indirect due to possible move to BLOS]

ii) Weather [real time weather information is needed at the UAE Server to help deciding, since the direct link between UAV-C and UAV may be affected by the weather; on the other hand BS-to-UAV connection may be more difficult to drop]

iii) Communication/C2 [quality assurance indication for the configured frequencies for C2 communication, is needed to check whether resources for indirect C2 are OK or need to change/increase]

C) The PC5 link degradation events from the applications/application enabler clients of the UAVs, for the direct C2 communication. One or more events that can be in the form of an alert that a PC5 communication gets lower link quality (e.g., by measuring the packet error rates, delays, NACK for one or more receiver UAVs etc.), or the overload/high interference indication in PC5 resources, due to the high utilization by other UAS communications. This may be based on one or both of the following: PC5 QoS monitoring by the UAV 201 (UAE client 301); and Monitoring of ProSe announcements reception by UAV 210 and/or UAV-C 203.

The UAE sever 221 determines a trigger for re-selection of C2 mode to in-direct, based on one or more of the inputs that received in previous step. The actual criteria for re-selection are implementation specific; nevertheless, the inputs for the PC5 events is the main criterion. Also, the information from UTM and SEAL support the UAE server 221 whether to decide on the re-selection or to keep the same C2 mode (e.g., for cases when the PC5 event is considered temporary).

Outputs of the C2-mode configuration are the following:

A) The UAE server 221 may request from application specific server to confirm the C2 mode (if the UAE server has not the capability to switch, but to influence/trigger the switching);

B) The UAE server 221 may request to the UAE clients 301 305 at the UAV/UAV-C to apply the change of C2 mode.

The procedure 300 provides the signaling for the scenarios when the C2-mode configuration functionality resides at the UAE server 221. In this case, the C2-mode configuration function triggers the re-selection from direct C2 communication to indirect.

At Step 0*a*, as a first precondition, UAV(s) and UAV-C are 1) registered to 5GS, 2) registered to UTM and UAV(s) are authorized for flight and 3) use C2 direct communication (the initial configuration of C2 is out of scope, e.g. can be pre-determined by the UAS operator) (see block 315).

At Step 0*b*, as a second precondition, the UAE server 221 is capable of using SEAL services, e.g., based on TS 23.434 (see block 317).

At Step 1*a*, the UTM and/or UAS Application-specific server 311 sends an initiation message which can take the form of an application specific requirement (which can be a requirement from one or more application specific server or a requirement from UTM) (see message 319). The application specific requirement message will provide to the UAE server the capability to manage C2 communication and includes at least one of the following parameters:

a) UAS identification;

b) One or more UAV and/or UAV controller identifications. This may include at least one of the following: external UE identifiers (GPSI, external ID) or permanent device identifiers (PEI/IMEI);

c) UAV/UAV-C IP address and port;

d) PLMN ID(s);

e) Transaction ID;

f) Group ID for a group of UAVs;

g) Application identifier (e.g. USS identifier);

h) UTM identifier;

i) C2 management request (as depicted);

j) geographical area where the requirement applies;

k) time of validity for the requirement.

At Step 1*b*, the UTM or the application specific server may provide at least one of the following parameters to the UAE server in a UAS context message:

a) UAV/UAV-C Application context/configuration information;

b) Real time weather information;

c) Communication/C2 (quality assurance indication for the configured frequencies for C2 communication); and d) Dynamic Reroute info (UAVs' updated/expected trajectories).

At Step 2*a*, the UAE server 221 sends to one or more UAE clients 301, 305 (in UAV 201 and/or UAV-C 203), a C2 UAE session setup request message (see messaging 323). The C2 UAW Session Setup Request includes a request to UAE client to send a first report to UAE server when a first condition occurs and comprises at least one of the following: UAS/UAV/UAV-C identification as Step 1*a*, UAE server ID(s) which can be the FQDN or IP address, UAE server capabilities, one or more application specific requirements, geographical area, time for session validity, transaction ID, location and capabilities of one or more UAVs in proximity, location and configuration of UAV-C, conditions for reporting trigger.

At Step 2*b*, the one or more UAE clients 301, 305 send a C2 UAE session setup response/result message (ACK/NACK) (see messaging 325).

At Step 3*a*, PC5 announcements/control messages are exchanged between the UAV-C 203 and the UAV 201, because ProSe is already in use (see block 327).

At Step 3*b*, a PC5 event message is sent from the UAE clients 301, 305 to the UAE server (see messaging 329). The PC5 event messaging may include at least one of the following:

a) UE IDs (GPSI, Application ID, PEI/IMEI, etc.);

b) C2 direct link degradation notification, Degradation of Application QoS attributes (reliability, latency, jitter, range, etc.);

c) PC5 expected outage notification; and d) UAV location information.

At Step 4*a*, the UAE server 221 requests the SEAL server 135 to provide Location information for the UAV 201 and receives a report (UAE server 201 acts as VAL server as in TS 3GPP 23.434) (see messaging 331). In particular, from Location Management (LM) Server, the UAE server 221 receives the precise location (geographical coordinates) of the UAV(s) 201 and ground UEs (e.g., UAV-C UE 307) in a given area (cell/TA area).

Continuing on FIG. 3B, at Step 4*b* the UAE Server 221 processes/augments the received location information with additional information mobility/position information (speed, ground Radar, RID broadcast) which may be provided by UTM/UAS application servers as part of Step 1*b* (see block 333).

At Step 5, the UAE server 221 determines whether to trigger the re-selection of C2 mode, based on UAE client report in Step 3*b* and the additional inputs in steps 4*a* and/or 4*b* (see block 335). In the depicted embodiment, it is assumed that the inputs and additional information cause the UAE server 221 to decide to trigger the re-selection of C2 mode from Direct mode to Indirect mode.

At Step 6, the UAE server 221 optionally sends a C2 mode change request to application specific server 311 to confirm the C2 mode change (see messaging 337). This message includes at least one of the following: UAS identification, affected UAV/UAV-C identification, application ID, current C2 mode, target C2 mode. Here, the Application specific server 311 sends a C2 mode change response/ACK and authorizes the UAE server to proceed with the update of the C2 mode. Step 6 is an optional step, based on configuration from the UAS specific server/UTM 311 in step 1*a*. Note, that instead of the application specific server, in this step the UTM may take the role of authorizing the C2 mode change.

At Step 7, the UAE server 221 sends to one or more UAE clients (301, 305) a C2 UAE session change request message (see messaging 339). The UAE Session Change Request includes at least one of the following: UAS/UAV/UAV-C identification, UAE server ID(s), change of C2 mode requirement (new C2 mode), geographical area, time for session validity, transaction ID, location and capabilities of one or more UAVs in proximity, location and configuration of the UAV-C 203.

At Step 8*a*, the UAE clients (301 and 305) instruct the respective UEs (i.e., UAV UE 303 and UAV-C UE 307) to switch the operation mode for the C2 communication session (see block 341). In certain embodiments, the respective UEs modify the C2 session when performing the operation mode switch. At Step 8*b*, the UAE clients (301, 305) send a C2 UAE session change response or notification (see messaging 343). Here, a UAE client may send an ACK response to indicate successful switching of the operation mode, or a NACK response to indicate unsuccessful switching.

Figure 4B:
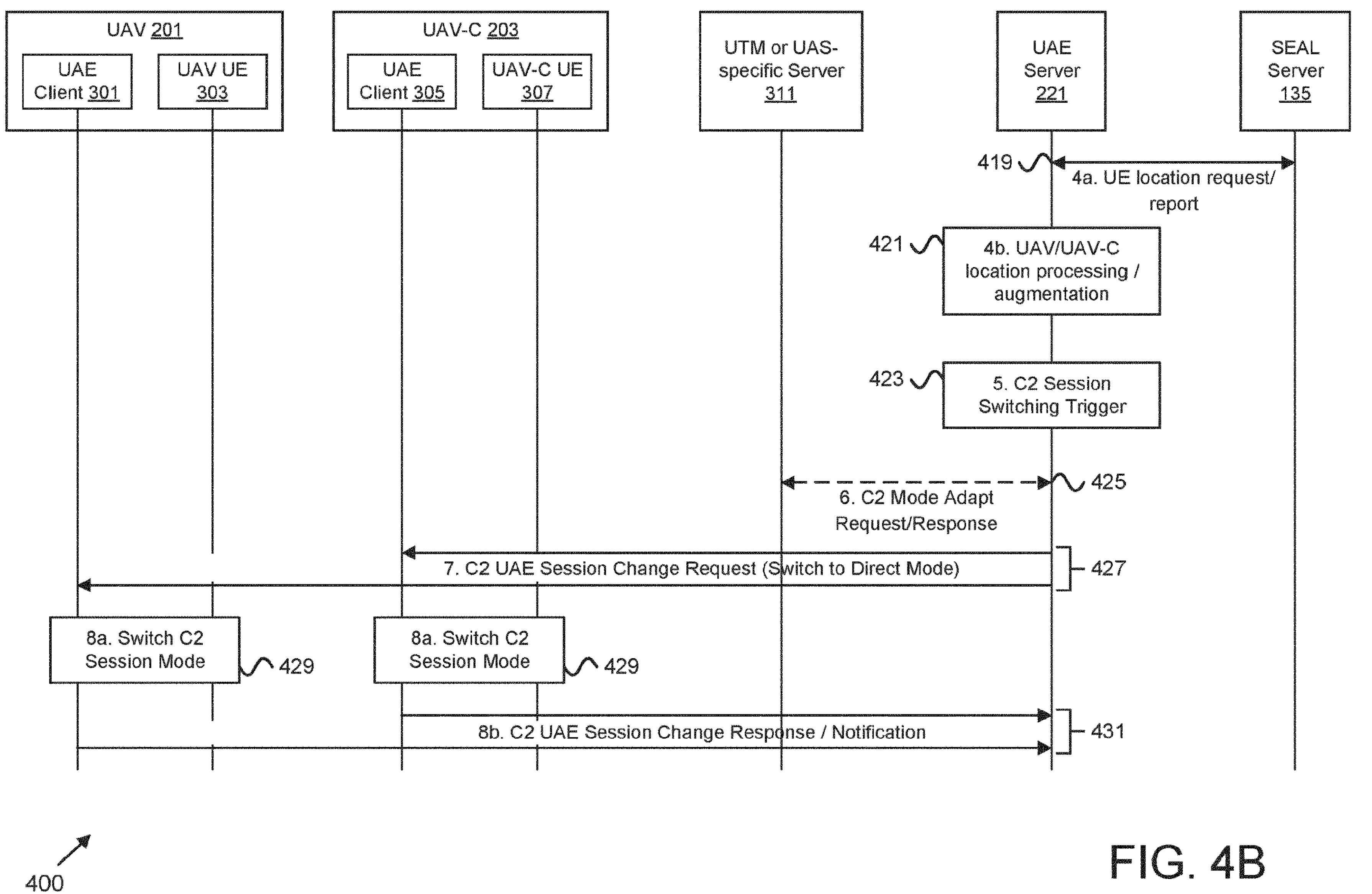
FIG. 4B continues the procedure of FIG. 4A.

FIGS. 4A-4B depicts a procedure 400 for a configuration phase of managing a C2 communication mode of operation, according to embodiments of the disclosure. The procedure 400 involves the UAV 201 (comprising the first UAE client 301 and the UAV UE 303), the UAV-C 203 (comprising the second UAE client 305 and the UAV-C UE 307), the UTM or UAS-specific application server 311 the UAE server 221, the SEAL server 135, and the mobile core network 120 (e.g., a 5GC or EPC). In the depicted embodiment, the middleware is distributed among a server and a client (aka UAE server 221 and UAE clients 301, 305 respectively).

The inputs for enabling the C2-mode configuration function to trigger the switching from indirect mode to direct mode, include:

A) Application-specific requirement, which in this case can be a requirement from the application specific server (or UTM) to give the capability to UAE server to monitor and manage the C2 communication. Note, that if the UAE server has already the authorization/capability to perform this action, no requirement needs to be conveyed, unless there is some updated requirement. This will trigger the establishment of an application session between the UAE server and client(s) for enabling the UAE server to receive direct link information and provide the required adaptations to the clients when/if required. Application specific server may also provide additional UAS context information, and in particular information mobility/position of the UAV (speed, ground Radar, RID broadcast).

B) The UAS server 221 will determine a trigger for re-selection of C2 mode to indirect, based on one or more of the inputs that received in previous step. The actual criteria for re-selection Inputs from application servers:

1) The SEAL server 135 is a support entity (e.g., as defined in 3GPP TS 23.434) which provides on-demand (subscription or request) services for all vertical enablers (e.g., UAE servers). The information that the SEAL server (s) 135 can provide to the UAE server 221 to support the C2 decision making process is the following:

i) From Location Management (LM) Server: the precise location of the UAVs and ground UEs in a given area (cell/TA area) which is acquired based on subscription to location monitoring by the UAVs/UAV-Cs.

2) The UTM can provide services to a UAS operator, such as services that are required to be used by the UAS operator due to governmental regulation, services that have a direct connection to a regulatory agency's system, services that may be used by the UAS operator to meet all or part of a governmental regulation, and services that provide value-added assistance to the UAS operator, but are not used for regulatory compliance (e.g., to meet an industry standard). Examples of specific support services include, but are not limited to, operations planning, intent sharing, strategic and tactical de-confliction, conformance monitoring, RID, Airspace Authorization, airspace management functions, and management of off-nominal situations. If we assume that the UAE acts on behalf of the UAS operator, the following information can be provided to aid the C2 switching:

i) Dynamic Reroute (inflight rerouting can be provided by UTM to avoid airborne conflicts. If UAE is aware of the UAV's updated expected trajectories, it can help deciding whether to keep indirect or switch to direct).

ii) Weather (real time weather information is needed at the UAE Server to help deciding, since the indirect link between UAV-C and UAV may be affected by the weather).

iii) Communication/C2 (quality assurance indication for the configured frequencies for C2 communication, is needed to check whether resources for indirect C2 are OK or need to change/increase).

C) When the in-direct communication is used, the UAE server, acting as Application Function (AF), may subscribe to NEF to receive monitoring information on possible QoS downgrade of one or more Uu links (UAV-C to Application Server or Application Server to UAV). These links may be provided by more than one PLMNs. So, the UAE server should receive every updated information on possible QoS downgrade (this is already supported for EPS, with Explicit Congestion Notification (ECN), defined in 3GPP TS 23.401, and for 5GS with QoS notification control (QNC), defined in 3GPP TS 23.501).

D) The PC5 feasibility indication for a C2 communication, which will provide the awareness/assistance to the UAE server to switch to direct C2 communication if it is possible and preferred option.

1) PC5 availability/feasibility may be captured at the UAV/UAV-C, e.g. the UAV-C may periodically broadcast signals in different frequencies, and upon reception of an ACK from the UAV to understand (based on the received signal, AoA, etc.) whether direct C2 is possible.

2) PC5 preference indication can be derived from the application of the UAV/UAV-C which may provide some priority of the C2 modes and this could be used as assistance information to the UAE server (for example since the application has the map, route and the location of UAVs even if the PC5 is possible, it may not be preferable due to obstacles that may be possible (e.g. in urban environment)).

The UAE server 221 will determine a trigger for re-selection of C2 mode to direct, based on one or more of the inputs that received in previous step. The actual criteria for re-selection are implementation specific; nevertheless, the inputs for the PC5 feasibility/availability and the status of Uu links are the main criteria. Also, the information from UTM and SEAL support the UAE server to take the decision to switch or to keep the indirect mode (e.g. for cases when the PC5 feasibility is temporary).

Outputs of the C2-mode configuration:

A) The UAE server 221 may request from application specific server to confirm the C2 mode (if the UAE server has not the capability to switch, but to influence/trigger the switching)

B) The UAE server 221 may request to the UAE clients at the UAV/UAV-C to apply the change of C2 mode. This will initiate the interaction with the 3GPP UEs to initiate a PC5/ProSe session establishment procedure.

The procedure 400 provides the signaling for the scenarios when the C2-mode configuration functionality resides at the UAE server. In this case, the C2-mode configuration function triggers the re-selection from indirect C2 communication to direct.

At Step 0*a*, as a first precondition, UAV(s) and UAV-C are 1) registered to 5GS, 2) registered to UTM and UAV(s) are authorized for flight and 3) use C2 indirect communication (the initial configuration of C2 is out of scope, e.g. can be pre-determined by the UAS operator) (see block 401).

At Step 0*b*, as a second precondition, the UAE server 221 is capable of using SEAL services, e.g., based on TS 23.434 (see block 403).

At Step 1*a*, the UTM and/or UAS Application-specific server 311 sends an initiation message which can take the form of an application specific requirement (which can be a requirement from one or more application specific server or a requirement from UTM) (see message 405). The application specific requirement message will provide to the UAE server the capability to manage C2 communication and includes at least one of the parameters discussed above in Step 1*a* of the procedure 300.

At Step 1*b*, the UTM or the application specific server may provide a UAS context message to the UAE server that contains at least one of the parameters:

a) UAV/UAV-C Application context/configuration information;

b) List of ProSe codes for direct C2 operation;

c) Real time weather information;

d) Communication/C2 (quality assurance indication for the configured frequencies for C2 communication); and e) Dynamic Reroute info (UAVs' updated/expected trajectories).

At Step 2*a*, the UAE server 221 sends to one or more UAE clients 301, 305 (in UAV 201 and/or UAV-C 203), a C2 UAE session setup request message (see messaging 409), which includes include a request to UAE client to monitor direct mode conditions (e.g., loss rate<X) and to send first reports to UAE server when a first condition occurs. C2 UAE session setup request message includes at least one of the following: UAS/UAV/UAV-C identification as Step 1*a*, UAE server ID(s) which can be the FQDN or IP address, UAE server capabilities, one or more application specific requirements, ProSe codes for direct C2 operation, geographical area, time for session validity, transaction ID, location and capabilities of one or more UAVs in proximity, location and configuration of UAV-C, PC5 monitoring request, conditions for reporting trigger.

At Step 2*b*, the one or more UAE clients 301, 305 send a C2 UAE session setup response/result message (e.g., ACK/NACK) (see messaging 325).

At Step 3*a*, PC5 discovery is performed between 3GPP UEs 303 and 307, e.g., as specified in ProSe Direct Discovery Models A, B defines in section 5.3 of 3GPP TS 23.303 (see block 413). The PC5 discovery information may be exchanged between UAE clients 301 and 305, based on the configured ProSe announcements (e.g., based on codes received in step 2*a*).

At Step 3*b*, when the UAE clients 303 and 307 are aware of the PC5 discovery, one or more clients may send a PC5 feasibility report to the UAE server, to notify on the PC5 possibility (see messaging 415). This PC5 feasibility report message may include the UE identifiers, the UAS identification, a PC5 availability/feasibility notification indication, PC5 capabilities/configuration. In certain embodiments, the PC5 feasibility report may also include a preference/priority of the C2 operation mode, e.g., based on application requirements at the UAV-C 203 and/or UAV 201.

At Step 3*c*, the UAE server 221, acting as Application Function (AF), may subscribe to NEF/SCEF in the mobile core network 120 to receive monitoring information on possible QoS downgrade of one or more Uu links (e.g., UAV-C-to-Application-Server or Application-Server-to-UAV) (see messaging 417). The monitoring report that the UAE server 221 is to receive every updated information on possible QoS downgrade (this is already supported for EPS, with Explicit Congestion Notification (ECN) [see 3GPP TS 23.401, 4.7.4], and for 5GS with QoS notification control (QNC) [see 3GPP TS 23.501, 5.7.2.4]).

Continuing on FIG. 4B, at Step 4*a* the UAE server 221 requests the SEAL server 135 to provide Location information for the UAV 201 and receives a report (e.g., the UAE server 201 acts as VAL server as in TS 3GPP 23.434) (see messaging 419). In particular, from Location Management (LM) Server, the UAE server 221 receives the precise location (geographical coordinates) of the UAV(s) 201 and ground UEs (e.g., UAV-C UE 307) in a given area (cell/TA area).

At Step 4*b*, the UAE Server 221 processes/augments the received location information with additional information mobility/position information (speed, ground Radar, RID broadcast) which may be provided by UTM/UAS application servers as part of Step 1*b* (see block 421).

At Step 5, the UAE server 221 determines whether to trigger the re-selection of C2 mode, based on UAE client report in Step 3*b* and the additional inputs in steps 4*a* and/or 4*b* (see block 423). In the depicted embodiment, it is assumed that the inputs and additional information cause the UAE server 221 to decide to trigger the re-selection of C2 mode from the Indirect mode to the Direct mode.

At Step 6, the UAE server 221 optionally sends a C2 mode change request to application specific server 311 to confirm the C2 mode change (see messaging 425). This message includes at least one of the following: UAS identification, affected UAV/UAV-C identification, application ID, current C2 mode, target C2 mode. Here, the Application specific server 311 sends a C2 mode change response (e.g., ACK) and authorizes the UAE server to proceed with the update of the C2 mode. Step 6 is an optional step, based on configuration from the UAS specific server/UTM 311 in step 1*a*. Note, that instead of the application specific server, in this step the UTM may take the role of authorizing the C2 mode change.

At Step 7, the UAE server 221 sends to one or more UAE clients (301, 305) a C2 UAE session change request message (see messaging 427). The UAE Session Change Request includes at least one of the following: UAS/UAV/UAV-C identification, UAE server ID(s), change of C2 mode requirement (new C2 mode), geographical area, time for session validity, transaction ID, location and capabilities of one or more UAVs in proximity, location and configuration of the UAV-C 203.

At Step 8*a*, the UAE clients (301 and 305) instruct the respective UEs (i.e., UAV UE 303 and UAV-C UE 307) to switch the operation mode for the C2 communication session (see block 429). In certain embodiments, the respective UEs modify the C2 session when performing the operation mode switch. At Step 8*b*, the UAE clients (301, 305) send a C2 UAE session change response or notification (see messaging 431). Here, a UAE client may send an ACK response to indicate successful switching of the operation mode, or a NACK response to indicate unsuccessful switching.

Figure 5:
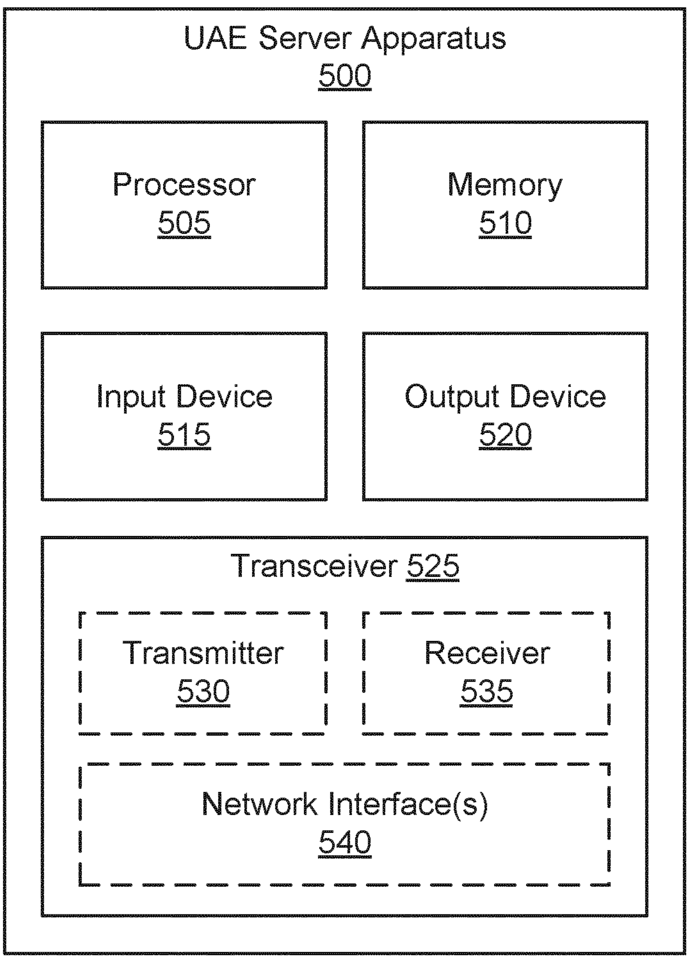
FIG. 5 is a diagram illustrating one embodiment of a UAE server apparatus that may be used for managing a C2 communication mode of operation.

FIG. 5 depicts one embodiment of a UAE server apparatus 500 that may be used for selecting a server application instance, according to embodiments of the disclosure. In some embodiments, the UAE server apparatus 500 may be one embodiment of a UAE server and its supporting hardware, such as the UAE server 133 and/or the UAE server 221, described above. Furthermore, UAE server apparatus 500 may include a processor 505, a memory 510, an input device 515, an output device 520, a transceiver 525. In some embodiments, the input device 515 and the output device 520 are combined into a single device, such as a touch screen. In certain embodiments, the UAE server apparatus 500 does not include any input device 515 and/or output device 520.

As depicted, the transceiver 525 includes at least one transmitter 530 and at least one receiver 535. Here, the transceiver 525 communicates with one or more remote units 55. Additionally, the transceiver 525 may support at least one network interface 540. In some embodiments, the transceiver 525 supports an interface (e.g., a Nnef interface) for communicating with a NEF (i.e., the NEF 127). Other network interfaces may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the processor 505 controls the UAE server apparatus 500 to implement the above described UAE server behaviors. In some embodiments, the transceiver 525 receives an application request to manage an operation mode of C2 communication for a first UAS. Here, the first UAS comprises a first UAV and a first UAV-C. The transceiver 525 receives a first report from an application of the first UAS, where the first application is located in one of the first UAV and the first UAV-C. The processor 505 determines to switch the operation mode of C2 communication for the first UAS based on the received first report and transmits, via the transceiver 525, a C2 communication switching instruction to the first UAS.

In some embodiments, the application request includes at least one of the following parameters: an identifier of the first UAV, an identifier of the first UAV-C, an IP address and port for the first UAV, an IP address and port for the first UAV-C, an application identifier, a C2 management requirement, a geographical area where the C2 management requirement applies, and a time of validity for the C2 management requirement.

In some embodiments, determining to switch the operation mode of C2 communication for the first UAS is determined with the support of application context information related to at least one UAS in the geographical area where the C2 management requirement applies. In certain embodiments, the application context information is provided by an application server and/or a UTM, wherein the application context information comprises at least one of the following parameters related to the at least one UAS: resource/bandwidth demand in the geographical area where the C2 management requirement applies, UAV location information, UAV expected trajectory, UAV speed/velocity, altitude, latitude, longitude, Ground Radar information, 3D Map, quality assurance indication for the configured frequencies for indirect C2 communication, and real-time weather information.

In some embodiments, the processor 505 establishes a communication session with the first UAV and the first UAV-C in response to receiving the application request. In such embodiments, the processor 505 modifies the communication session with the first UAV and the first UAV-C in response to determining to switch C2 communication for the first UAS. In certain embodiments, the operation mode of C2 communication is a direct mode when the communication session is established. In such embodiments, the communication session provides configuration parameters (e.g., trigger conditions) for the first UAV to monitor direct mode conditions and to trigger transmission of a direct mode link degradation report based on the configuration parameters. In other embodiments, the operation mode of C2 communication is an indirect mode when the communication session is established. In such embodiments, the communication session provides configuration parameters (e.g., trigger conditions) for the first UAV to monitor direct mode conditions and to trigger the transmission of a direct mode feasibility report based on the configuration parameters.

In various embodiments, the operation mode of C2 communication is a direct mode when the first report is received. In such embodiments, the first report is a trigger event report and/or a direct mode link degradation report. Additionally, the C2 communication switching instruction includes an instruction to switch from the direct mode to an indirect mode of C2 communication. In certain embodiments, the trigger event is an event indicating a change at the direct C2 communication and comprises at least one of the following: an identifier of the first UAV, an identifier of the first UAV-C, a UAS identifier, a ProSe code, a PC5 QoS degradation notification, an application QoS attribute for the ongoing direct C2 session (i.e., reliability, latency, jitter, range, etc.), and/or a PC5 expected outage notification.

In various embodiments, the operation mode of C2 communication is an indirect mode when the first report is received. In such embodiments, the first report comprises a direct mode feasibility report. Additionally, the C2 communication switching instruction includes an instruction to switch from the indirect mode to a direct mode of C2 communication. In certain embodiments, the direct mode feasibility report comprises at least one of the following: an identifier of the first UAV, an identifier of the first UAV-C, a UAS identifier, direct link condition information, and PC5 availability notification indication. Here, the determination to switch the operation mode of C2 communication to direct mode (i.e., based on the received direct mode feasibility report) is determined with the support of QoS notification for the indirect C2 communication.

In some embodiments, the determination to switch the operation mode of C2 communication for the first UAS is based on a relative location between the first UAV and the first UAV-C. In certain embodiments, the processor 505 augments the relative location with at least one the application context information. In such embodiments, the determination to switch the operation mode of C2 communication for the first UAS is based on the augmented relative location.

In some embodiments, the C2 communication switching instruction is sent to an application of the first UAV and to an application of the first UAV-C. In such embodiments, the C2 communication switching instruction comprises at least one of the following parameters: UAS identification, affected UAV identification, affected UAV-C identification, application ID, current C2 mode, and/or target C2 mode.

In various embodiments, the transceiver 525 receives an acknowledgement from the first UAV and/or the first UAV-C that the C2 communication switching instruction was applied. In such embodiments, the processor 505 may transmit, via the transceiver 525, a notification to the at least one application server in response to receiving the acknowledgement.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to selecting a server application instance, for example storing server addresses, UE locations, DNS cache, and the like. In certain embodiments, the memory 510 also stores program code and related data, such as an operating system ("OS") or other controller algorithms operating on the UAE server apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 120). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
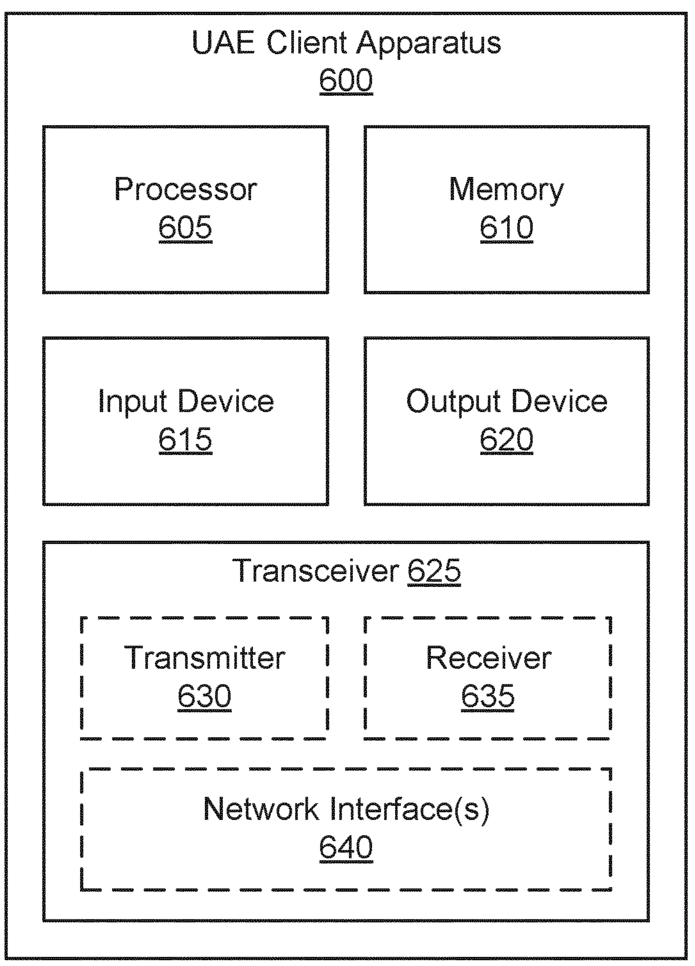
FIG. 6 is a diagram illustrating one embodiment of a UAE client apparatus that may be used for managing a C2 communication mode of operation.

FIG. 6 depicts a UAE client apparatus 600 that may be used for managing a C2 communication mode of operation, according to embodiments of the disclosure. In various embodiments, the UAE client apparatus 600 is used to implement one or more of the solutions described above. The UAE client apparatus 600 may be one embodiment of a UAE client and its supporting hardware, such as the UAV 103, the UAV controller 104, the UAV 201, the UAV-C 203, the UAE client 205, the UAE client 301, and/or the UAE client 305, described above. Furthermore, the UAE client apparatus 600 may include a processor 605, a memory 610, an input device 615, an output device 620, and a transceiver 625. In some embodiments, the input device 615 and the output device 620 are combined into a single device, such as a touchscreen. In certain embodiments, the UAE client apparatus 600 may not include any input device 615 and/or output device 620. In various embodiments, the UAE client apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the UAE client apparatus 600 to implement the above described UAE client behaviors. In some embodiments, the transceiver 625 receives a first request message to monitor link conditions for an operation mode of C2 communication for a first UAS, the first UAS comprising a first UAV and a first UAV-C. The processor 605 transmits, via the transceiver 625, a first report based on the monitored link conditions. In one embodiment, the first report is a direct mode feasibility report. In another embodiment, the first report is a direct mode link degradation report and/or a trigger event report. The processor 605 receives, via the transceiver 625, a C2 communication switching instruction to the application of the first UAS and modifies a C2 communication session of the first UAS in response to the C2 communication switching instruction.

In some embodiments, the operation mode of C2 communication is a direct mode when the first request message is received. In such embodiments, the first request message provides configuration parameters (e.g., trigger conditions) for the first UAV to monitor degradation of direct mode conditions and to trigger transmission of a direct mode link degradation report based on the configuration parameters.

In some embodiments, the operation mode of C2 communication is an indirect mode when the first request message is received. In such embodiments, the first request message provides configuration parameters for the first UAV to monitor condition for the feasibility of direct mode C2 communication and to trigger the transmission of a direct mode feasibility report based on the configuration parameters.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to SL HARQ operation. For example, the memory 610 may store V2X communication resources, V2X configuration policies, UE-to-UE graphs, and the like. In certain embodiments, the memory 610 also stores program code and related data, such as an operating system or other controller algorithms operating on the remote unit 65.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the UAE client apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more V2X UEs. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

In various embodiments, the transceiver 625 is configured to communication with 3GPP access network(s) and/or the non-3GPP access network(s). In some embodiments, the transceiver 625 implements modem functionality for the 3GPP access network(s) and/or the non-3GPP access network(s). In one embodiment, the transceiver 625 implements multiple logical transceivers using different communication protocols or protocol stacks, while using common physical hardware.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

The transceiver 625 may include one or more transmitters 630 and one or more receivers 635. Although a specific number of transmitters 630 and receivers 635 are illustrated, the UAE client apparatus 600 may have any suitable number of transmitters 630 and receivers 635. Further, the transmitter(s) 630 and the receiver(s) 635 may be any suitable type of transmitters and receivers. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like.

In various embodiments, the transceiver 625 is capable of communicating with a mobile core network via an access network. Accordingly, the transceiver 625 may support at least one network interface 640. Here, the at least one network interface 640 facilitates communication with a RAN node, such as an eNB or gNB, for example using the "Uu" interface (e.g., LTE-Uu for eNB, NR-Uu for gNB). Additionally, the at least one network interface 640 may include an interface used for communications with one or more network functions in the mobile core network, such as a UPF 141, an AMF 143, and/or a SMF 145. For V2X communications, the transceiver 625 may support a PC5 interface for direct UE-to-UE communication.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module. In certain embodiments, the transceiver 625 may implement a 3GPP modem (e.g., for communicating via NR or LTE access networks) and a non-3GPP modem (e.g., for communicating via Wi-Fi or other non-3GPP access networks).

Figure 7:
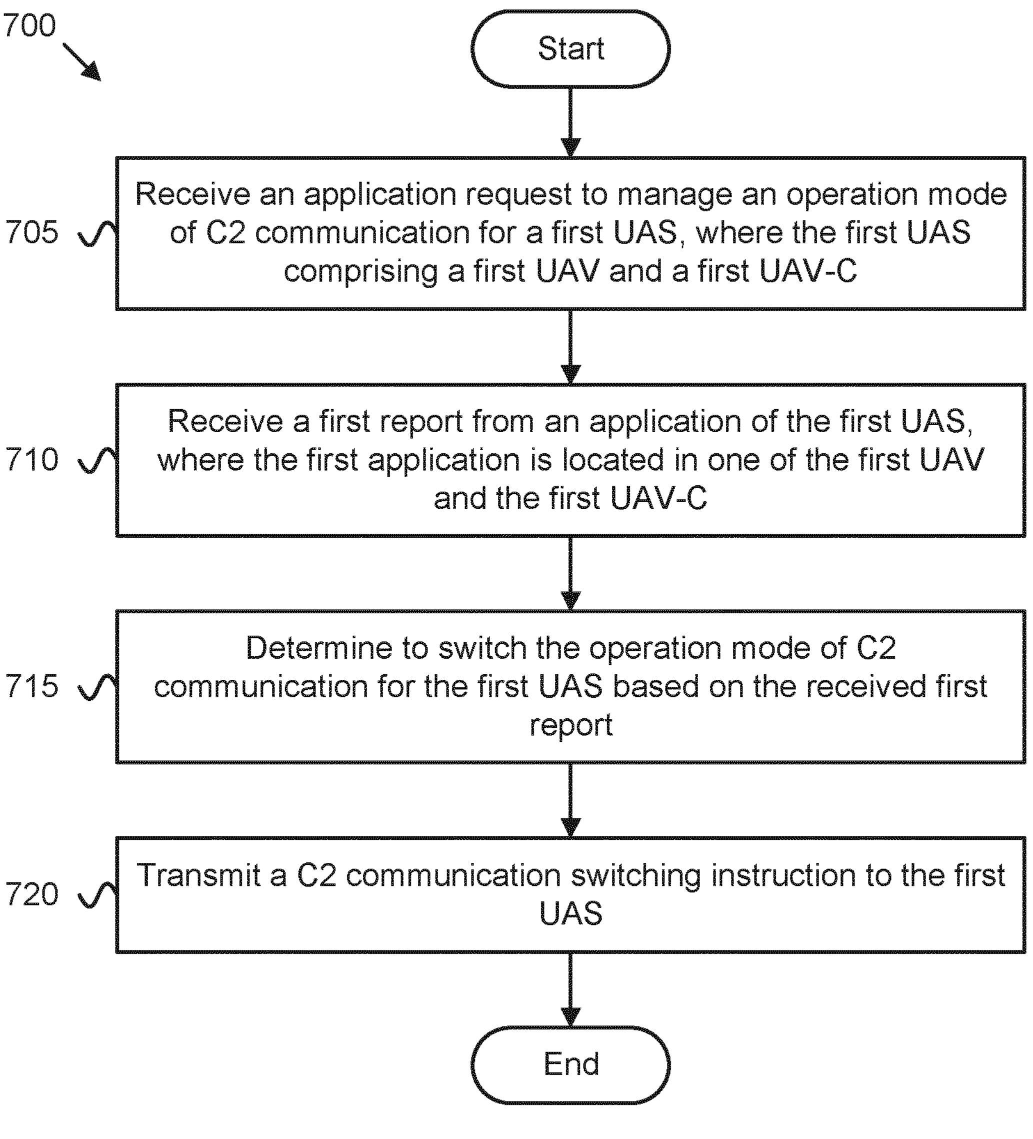
FIG. 7 is a flowchart diagram illustrating one embodiment of a method that may be used for managing a C2 communication mode of operation.

FIG. 7 depicts one embodiment of a method 700 for managing a C2 communication mode of operation, according to embodiments of the disclosure. In various embodiments, the method 700 is performed by a UAE server, such as the UAE server 133, the UAE server 221, and/or the UAE server apparatus 500, described above. In some embodiments, the method 700 is performed by a processor, such as a microcontroller, a microprocessor, a CPU, a GPU, an auxiliary processing unit, a FPGA, or the like.

The method 700 begins and receives 705 an application request to manage an operation mode of C2 communication for a first UAS, where the first UAS comprising a first UAV and a first UAV-C. The method 700 includes receiving 710 a first report from an application of the first UAS, where the first application is located in one of the first UAV and the first UAV-C. The method 700 includes determining 715 to switch the operation mode of C2 communication for the first UAS based on the received first report. The method 700 includes transmitting 720 a C2 communication switching instruction to the first UAS. The method 700 ends.

Figure 8:
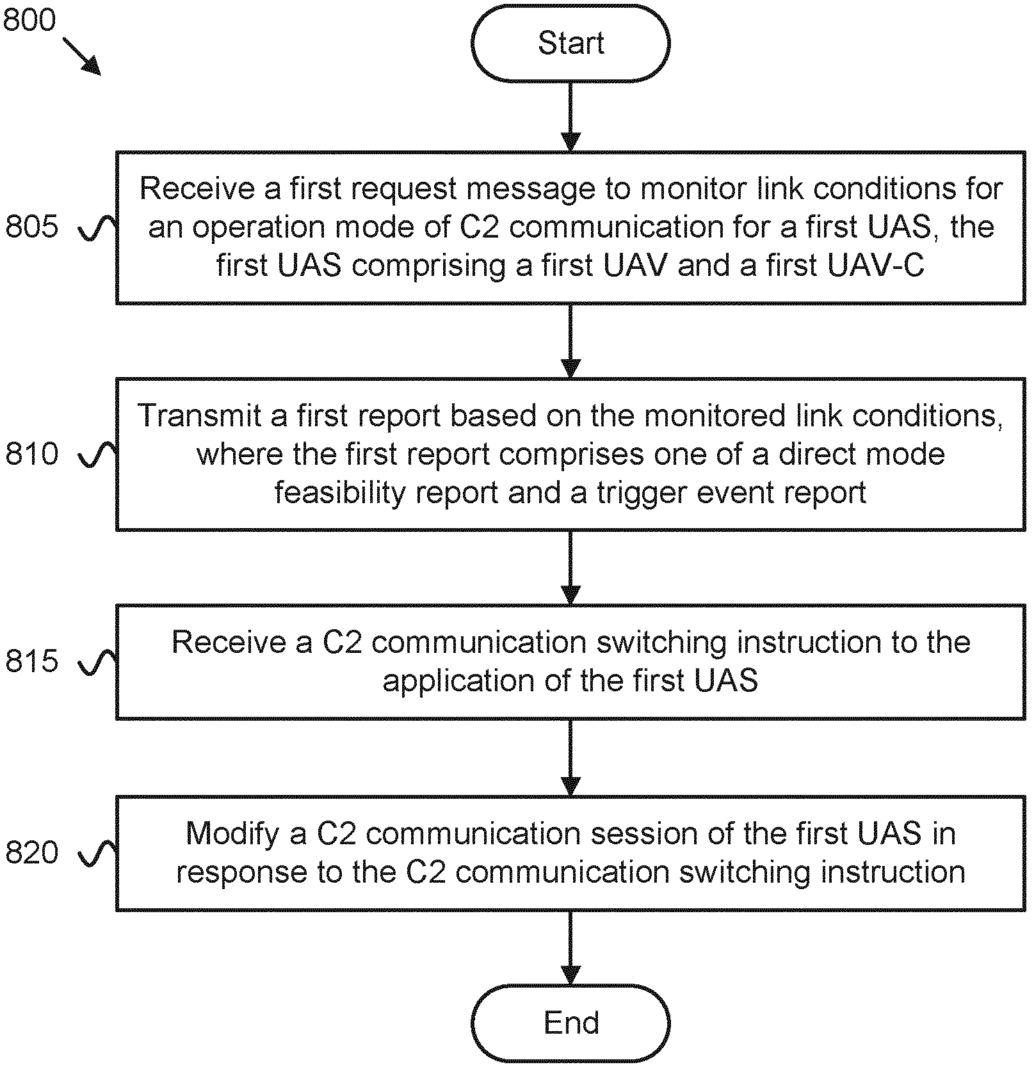
FIG. 8 is a flowchart diagram illustrating one embodiment of a method that may be used for managing a C2 communication mode of operation.

FIG. 8 depicts one embodiment of a method 800 for managing a C2 communication mode of operation, according to embodiments of the disclosure. In various embodiments, the method 800 is performed by a UAE client, such as the UAV 103, the UAV controller 104, the UAV 201, the UAV-C 203, the UAE client 205, the UAE client 301, the UAE client 305, and/or the UAE client apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a first request message to monitor link conditions for an operation mode of C2 communication for a first UAS, the first UAS comprising a first UAV and a first UAV-C. The method 800 includes transmitting 810 a first report based on the monitored link conditions, where the first report comprises one of a direct mode feasibility report and a trigger event report. The method 800 includes receiving 815 a C2 communication switching instruction to the application of the first UAS. The method 800 includes modifying 820 a C2 communication session of the first UAS in response to the C2 communication switching instruction. The method 800 ends.

Disclosed herein is a first apparatus for managing a C2 communication mode of operation, according to embodiments of the disclosure. The first apparatus may be implemented by a UAE server, such as the UAE server 133, the UAE server 221, and/or the UAE server apparatus 500, described above. The first apparatus includes a transceiver that receives an application request to manage an operation mode of C2 communication for a first UAS. Here, the first UAS comprises a first UAV and a first UAV-C. The transceiver receives a first report from an application of the first UAS, where the first application is located in one of the first UAV and the first UAV-C. The processor determines to switch the operation mode of C2 communication for the first UAS based on the received first report and transmits, via the transceiver, a C2 communication switching instruction to the first UAS.

In some embodiments, the application request includes at least one of the following parameters: an identifier of the first UAV, an identifier of the first UAV-C, an IP address and port for the first UAV, an IP address and port for the first UAV-C, an application identifier, a C2 management requirement, a geographical area where the C2 management requirement applies, and a time of validity for the C2 management requirement.

In some embodiments, determining to switch the operation mode of C2 communication for the first UAS is determined with the support of application context information related to at least one UAS in the geographical area where the C2 management requirement applies. In certain embodiments, the application context information is provided by an application server and/or a UTM, wherein the application context information comprises at least one of the following parameters related to the at least one UAS: resource/bandwidth demand in the geographical area where the C2 management requirement applies, UAV location information, UAV expected trajectory, UAV speed/velocity, altitude, latitude, longitude, Ground Radar information, 3D Map, quality assurance indication for the configured frequencies for indirect C2 communication, and real-time weather information.

In some embodiments, the processor establishes a communication session with the first UAV and the first UAV-C in response to receiving the application request. In such embodiments, the processor modifies the communication session with the first UAV and the first UAV-C in response to determining to switch C2 communication for the first UAS. In certain embodiments, the operation mode of C2 communication is a direct mode when the communication session is established. In such embodiments, the communication session provides configuration parameters (e.g., trigger conditions) for the first UAV to monitor direct mode conditions and to trigger transmission of a direct mode link degradation report based on the configuration parameters. In other embodiments, the operation mode of C2 communication is an indirect mode when the communication session is established. In such embodiments, the communication session provides configuration parameters (e.g., trigger conditions) for the first UAV to monitor direct mode conditions and to trigger the transmission of a direct mode feasibility report based on the configuration parameters.

In various embodiments, the operation mode of C2 communication is a direct mode when the first report is received. In such embodiments, the first report is a trigger event report and/or a direct mode link degradation report. Additionally, the C2 communication switching instruction includes an instruction to switch from the direct mode to an indirect mode of C2 communication. In certain embodiments, the trigger event is an event indicating a change at the direct C2 communication and comprises at least one of the following: an identifier of the first UAV, an identifier of the first UAV-C, a UAS identifier, a ProSe code, a PC5 QoS degradation notification, an application QoS attribute for the ongoing direct C2 session (i.e., reliability, latency, jitter, range, etc.), and/or a PC5 expected outage notification.

In various embodiments, the operation mode of C2 communication is an indirect mode when the first report is received. In such embodiments, the first report comprises a direct mode feasibility report. Additionally, the C2 communication switching instruction includes an instruction to switch from the indirect mode to a direct mode of C2 communication. In certain embodiments, the direct mode feasibility report comprises at least one of the following: an identifier of the first UAV, an identifier of the first UAV-C, a UAS identifier, direct link condition information, and PC5 availability notification indication. Here, the determination to switch the operation mode of C2 communication to direct mode (i.e., based on the received direct mode feasibility report) is determined with the support of QoS notification for the indirect C2 communication.

In some embodiments, the determination to switch the operation mode of C2 communication for the first UAS is based on a relative location between the first UAV and the first UAV-C. In certain embodiments, the processor augments the relative location with at least one the application context information. In such embodiments, the determination to switch the operation mode of C2 communication for the first UAS is based on the augmented relative location.

In some embodiments, the C2 communication switching instruction is sent to an application of the first UAV and to an application of the first UAV-C. In such embodiments, the C2 communication switching instruction comprises at least one of the following parameters: UAS identification, affected UAV identification, affected UAV-C identification, application ID, current C2 mode, and/or target C2 mode.

In various embodiments, the transceiver receives an acknowledgement from the first UAV and/or the first UAV-C that the C2 communication switching instruction was applied. In such embodiments, the processor may transmit, via the transceiver, a notification to the at least one application server in response to receiving the acknowledgement.

Disclosed herein is a first method for managing a C2 communication mode of operation, according to embodiments of the disclosure. The first method may be performed by a UAE server, such as the UAE server 133, the UAE server 221, and/or the UAE server apparatus 500, described above. The first method includes receiving an application request to manage an operation mode of C2 communication for a first UAS, here the first UAS comprises a first UAV and a first UAV-C. The first method includes receiving a first report from an application of the first UAS, where the first application is located in one of the first UAV and the first UAV-C. The first method includes determining to switch the operation mode of C2 communication for the first UAS based on the received first report and transmitting a C2 communication switching instruction to the first UAS.

In some embodiments, the application request includes at least one of the following parameters: an identifier of the first UAV, an identifier of the first UAV-C, an IP address and port for the first UAV, an IP address and port for the first UAV-C, an application identifier, a C2 management requirement, a geographical area where the C2 management requirement applies, and a time of validity for the C2 management requirement.

In some embodiments, determining to switch the operation mode of C2 communication for the first UAS is determined with the support of application context information related to at least one UAS in the geographical area where the C2 management requirement applies. In certain embodiments, the application context information is provided by an application server and/or a UTM, wherein the application context information comprises at least one of the following parameters related to the at least one UAS: resource/bandwidth demand in the geographical area where the C2 management requirement applies, UAV location information, UAV expected trajectory, UAV speed/velocity, altitude, latitude, longitude, Ground Radar information, 3D Map, quality assurance indication for the configured frequencies for indirect C2 communication, and real-time weather information.

In some embodiments, the first method includes establishing a communication session with the first UAV and the first UAV-C in response to receiving the application request. In such embodiments, the first method includes modifying the communication session with the first UAV and the first UAV-C in response to determining to switch C2 communication for the first UAS. In certain embodiments, the operation mode of C2 communication is a direct mode when the communication session is established. In such embodiments, the communication session provides configuration parameters (e.g., trigger conditions) for the first UAV to monitor direct mode conditions and to trigger transmission of a direct mode link degradation report based on the configuration parameters. In other embodiments, the operation mode of C2 communication is an indirect mode when the communication session is established. In such embodiments, the communication session provides configuration parameters (e.g., trigger conditions) for the first UAV to monitor direct mode conditions and to trigger the transmission of a direct mode feasibility report based on the configuration parameters.

In various embodiments, the operation mode of C2 communication is a direct mode when the first report is received. In such embodiments, the first report is a trigger event report and/or a direct mode link degradation report. Additionally, the C2 communication switching instruction includes an instruction to switch from the direct mode to an indirect mode of C2 communication. In certain embodiments, the trigger event is an event indicating a change at the direct C2 communication and comprises at least one of the following: an identifier of the first UAV, an identifier of the first UAV-C, a UAS identifier, a ProSe code, a PC5 QoS degradation notification, an application QoS attribute for the ongoing direct C2 session (i.e., reliability, latency, jitter, range, etc.), and/or a PC5 expected outage notification.

In various embodiments, the operation mode of C2 communication is an indirect mode when the first report is received. In such embodiments, the first report comprises a direct mode feasibility report. Additionally, the C2 communication switching instruction includes an instruction to switch from the indirect mode to a direct mode of C2 communication. In certain embodiments, the direct mode feasibility report comprises at least one of the following: an identifier of the first UAV, an identifier of the first UAV-C, a UAS identifier, direct link condition information, and PC5 availability notification indication. Here, the determination to switch the operation mode of C2 communication to direct mode (i.e., based on the received direct mode feasibility report) is determined with the support of QoS notification for the indirect C2 communication.

In some embodiments, the determination to switch the operation mode of C2 communication for the first UAS is based on a relative location between the first UAV and the first UAV-C. In certain embodiments, the first method also includes augmenting the relative location with at least one the application context information. In such embodiments, the determination to switch the operation mode of C2 communication for the first UAS is based on the augmented relative location.

In some embodiments, the C2 communication switching instruction is sent to an application of the first UAV and to an application of the first UAV-C. In such embodiments, the C2 communication switching instruction comprises at least one of the following parameters: UAS identification, affected UAV identification, affected UAV-C identification, application ID, current C2 mode, and/or target C2 mode.

In various embodiments, the first method includes receiving an acknowledgement from the first UAV and/or the first UAV-C that the C2 communication switching instruction was applied. In such embodiments, the first method may include transmitting a notification to the at least one application server in response to receiving the acknowledgement.

Disclosed herein is a second apparatus for managing a C2 communication mode of operation, according to embodiments of the disclosure. The second apparatus may be implemented by a UAE client, such as the UAV 103, the UAV controller 104, the UAV 201, the UAV-C 203, the UAE client 205, the UAE client 301, the UAE client 305, and/or the UAE client apparatus 600, described above. The second apparatus includes a processor and a transceiver that receives a first request message to monitor link conditions for an operation mode of C2 communication for a first UAS, the first UAS comprising a first UAV and a first UAV-C. Via the transceiver, the processor transmits a first report based on the monitored link conditions. Here, the first report comprises one of a direct mode feasibility report and a trigger event report. The processor receives, via the transceiver, a C2 communication switching instruction to the application of the first UAS and modifies a C2 communication session of the first UAS in response to the C2 communication switching instruction.

In some embodiments, the operation mode of C2 communication is a direct mode when the first request message is received. In such embodiments, the first request message provides configuration parameters (e.g., trigger conditions) for the first UAV to monitor degradation of direct mode conditions and to trigger transmission of a direct mode link degradation report based on the configuration parameters.

In some embodiments, the operation mode of C2 communication is an indirect mode when the first request message is received. In such embodiments, the first request message provides configuration parameters for the first UAV to monitor condition for the feasibility of direct mode C2 communication and to trigger the transmission of a direct mode feasibility report based on the configuration parameters.

Disclosed herein is a second method for managing a C2 communication mode of operation, according to embodiments of the disclosure. The second method may be implemented by a UAE client, such as the UAV 103, the UAV controller 104, the UAV 201, the UAV-C 203, the UAE client 205, the UAE client 301, the UAE client 305, and/or the UAE client apparatus 600, described above. The second method includes receiving a first request message to monitor link conditions for an operation mode of C2 communication for a first UAS. Here, the first UAS comprises a first UAV and a first UAV-C. The second method includes transmitting a first report based on the monitored link conditions. Here, the first report comprises one of: a direct mode feasibility report, a direct mode link degradation report and a trigger event report. The second method includes receiving a C2 communication switching instruction to the application of the first UAS and modifying a C2 communication session of the first UAS in response to the C2 communication switching instruction.

In some embodiments, the operation mode of C2 communication is a direct mode when the first request message is received. In such embodiments, the first request message provides configuration parameters (e.g., trigger conditions) for the first UAV to monitor degradation of direct mode conditions and to trigger transmission of a direct mode link degradation report based on the configuration parameters.

In some embodiments, the operation mode of C2 communication is an indirect mode when the first request message is received. In such embodiments, the first request message provides configuration parameters for the first UAV to monitor condition for the feasibility of direct mode C2 communication and to trigger the transmission of a direct mode feasibility report based on the configuration parameters.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:

at least one memory; and at least one processor coupled with the at least one memory and configured to cause the apparatus to:

receive an application request to manage an operation mode of Command-and-Control ("C2") communication for a unmanned aerial system ("UAS"), the UAS comprising a unmanned aerial vehicle ("UAV") and a UAV controller ("UAV-C"), wherein the application request comprises a C2 management requirement;

establish a communication session with the UAV and the UAV-C in response to receiving the application request, wherein the communication session provides configuration parameters for the UAV to trigger transmission of a first report based on a trigger event;

receive the first report from an application of the UAS, wherein the application is located in the UAV or the UAV-C, wherein the first report is based on the trigger event, the trigger event comprising a PC5 quality of service ("QoS") degradation notification;

acquire application context information related to at least one UAS in a geographic area where the C2 management requirement applies, the application context information comprising at least one of the following parameters related to the at least one UAS: resource or bandwidth demand in the geographic area, UAV speed, UAV velocity, UAV latitude, UAV longitude, ground radar information, three-dimensional ("3D") Map, real-time weather information in the geographic area, or a combination thereof;

determine to switch the operation mode of C2 communication for the UAS from a direct mode to an indirect mode based in part on the trigger event and on the application context information;

determine to modify the communication session with the UAV and the UAV-C in response to determining to switch the operation mode of C2 communication;

transmit a first C2 communication to the UAS comprising an instruction to switch the operation mode of C2 communication from the direct mode to the indirect mode;

receive a second report from the application of the UAS after determining to modify the communication session; and transmit a second C2 communication to the UAS comprising an instruction to switch the operation mode of C2 communication from the indirect mode to the direct mode based on the second report.

2. The apparatus of claim 1, wherein the application request further includes at least one of the following parameters: an identifier of the UAV, an identifier of the UAV-C, an internet protocol ("IP") address and port for the UAV, an IP address and port for the UAV-C, an application identifier, the geographic area where the C2 management requirement applies, a time of validity for the C2 management requirement, or a combination thereof.

3. The apparatus of claim 1, wherein the application context information is provided by an application server or a UAS Traffic Manager ("UTM"), wherein the application context information further comprises at least one of the following parameters related to the at least one UAS: UAV expected trajectory, UAV altitude, quality assurance indication for a set of configured frequencies for indirect C2 communication, or a combination thereof.

4. The apparatus of claim 1, wherein the operation mode of C2 communication is the direct mode when the communication session is established, wherein the communication session provides configuration parameters for the UAV to monitor one or more direct mode conditions and the first report comprises a direct mode link degradation report based on the configuration parameters.

5. The apparatus of claim 1, wherein the operation mode of C2 communication is the indirect mode when the communication session is established, wherein the communication session provides configuration parameters for the UAV to monitor one or more direct mode conditions and the second report comprises a direct mode feasibility report based on the configuration parameters.

6. The apparatus of claim 1, wherein the at least one processor is configured to cause the apparatus to modify the communication session with the UAV and the UAV-C in response to determining to modify the communication session.

7. The apparatus of claim 1, wherein the trigger event is an event indicating a change of one or more conditions associated with the operation mode of C2 communication and further comprises at least one of the following: an identifier of the UAV, an identifier of the UAV-C, a UAS identifier, a ProSe code, an application QoS attribute for an ongoing C2 session in the direct mode, a PC5 expected outage notification, or a combination thereof.

8. The apparatus of claim 1, wherein the operation mode of C2 communication is the indirect mode when the second report is received, and wherein the second report comprising a direct mode feasibility report.

9. The apparatus of claim 8, wherein the direct mode feasibility report comprises at least one of the following: an identifier of the UAV, an identifier of the UAV-C, a UAS identifier, direct link condition information, PC5 availability notification indication, or a combination thereof.

10. The apparatus of claim 9, wherein the at least one processor is configured to cause the apparatus to determine to switch the operation mode of C2 communication for the UAS from the indirect mode to a direct mode based at least in part on the direct mode feasibility report and a QoS notification for the indirect C2 communication.

11. The apparatus of claim 1, wherein the at least one processor is configured to cause the apparatus to determine to switch the operation mode of C2 communication for the UAS based on a relative location between the UAV and the UAV-C.

12. The apparatus of claim 11, wherein the at least one processor is further configured to cause the apparatus to determine an augmented relative location using the relative location and at least one application context information, and wherein the at least one processor is further configured to cause the apparatus to switch the operation mode of C2 communication for the UAS is determined based at least in part on the augmented relative location.

13. The apparatus of claim 1, wherein the at least one processor is configured to cause the apparatus to transmit the first C2 communication to an application of the UAV and to an application of the UAV-C, and wherein the first C2 communication comprises at least one of the following parameters: UAS identification, affected UAV identification, affected UAV-C identification, application identifier ("ID"), current C2 mode, target C2 mode, or a combination thereof.

14. The apparatus of claim 1, wherein the at least one processor is configured to cause the apparatus to transmit a notification to at least one application server in response to receiving an acknowledgement from the UAV or the UAV-C that the operation mode of C2 communication was switched from the direct mode to the indirect mode or switched from the indirect mode to the direct mode.

15. The apparatus of claim 1, wherein the at least one processor is configured to cause the apparatus to configure the application of the UAS to transmit the first report in response to the trigger event.

16. The apparatus of claim 1, wherein:
- the at least one processor is further configured to cause the apparatus to:
  - modify the communication session by transmitting the first C2 communication; and
  - receive the second report while the operation of the C2 communication is the indirect mode; and
- the second report comprises a direct mode feasibility report.

17. A method performed by an unmanned aerial vehicle ("UAV"), the method comprising:
- establishing a communication session with an unmanned aerial system ("UAS") application enabler ("UAE") server;
- receiving, from the UAE, a first request message to monitor link conditions for an operation mode of Command-and-Control ("C2") communication session for a UAS relating to a geographic area where a C2 management requirement applies and comprising the UAV and a UAV controller ("UAV-C"), wherein the first request message comprises first configuration parameters for the UAV to trigger transmission of a first report based on a trigger event;
- determine a trigger event based on the monitored link conditions;
- transmitting, to the UAE, the first report based on the trigger event, wherein the trigger event comprises a PC5 quality of service ("QoS") degradation notification;
- receiving, from the UAE, a first C2 communication comprising an instruction to switch from a direct mode to an indirect mode of C2 communication based on application context information acquired by the UAE, wherein the application context information is related to the UAS and comprises at least one of the following parameters related to the at least one UAS: resource or bandwidth demand in the geographic area, UAV speed, UAV velocity, UAV latitude, UAV longitude, ground radar information, three-dimensional ("3D") Map, real-time weather information in the geographic area, or a combination thereof;
- modifying a C2 communication session of the UAS in response to the first C2 communication;
- transmitting, to the UAE, a second report after modifying the C2 communication session of the UAS; and
- receiving, from the UAE, a second C2 communication comprising an instruction to switch the operation mode of C2 communication from the indirect mode to the direct mode based on the second report.

18. The method of claim 17, wherein the operation mode of C2 communication is the direct mode when the first request message is received, wherein the configuration parameters configure the UAV to monitor one or more direct mode conditions and the first report comprises a direct mode link degradation report based on the configuration parameters.

19. The method of claim 17, further comprising receiving a second request message, wherein the operation mode of C2 communication is the indirect mode when the second request message is received, wherein the second request message configures the UAV to monitor one or more direct mode conditions and to trigger the transmission of the second report, and wherein the second report comprises a direct mode feasibility report based on the configuration parameters.

* * * * *